(12) United States Patent
Kitamura

(10) Patent No.: US 8,742,681 B2
(45) Date of Patent: Jun. 3, 2014

(54) LED LIGHTING DEVICE, ILLUMINATING DEVICE AND POWER SUPPLY THEREFORE HAVING A NORMALLY-ON TYPE SWITCHING ELEMENT

(75) Inventor: Noriyuki Kitamura, Yokosuka (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 382 days.

(21) Appl. No.: 12/942,055

(22) Filed: Nov. 9, 2010

(65) Prior Publication Data

US 2011/0109241 A1    May 12, 2011

(30) Foreign Application Priority Data

| Nov. 9, 2009 | (JP) | ................................ | 2009-256363 |
| Feb. 10, 2010 | (JP) | ................................ | 2010-027398 |
| Mar. 19, 2010 | (JP) | ................................ | 2010-064436 |
| Oct. 19, 2010 | (JP) | ................................ | 2010-234641 |

(51) Int. Cl.
| H05B 37/02 | (2006.01) |
| H05B 39/04 | (2006.01) |
| H05B 41/36 | (2006.01) |
| G05F 1/00 | (2006.01) |
| H05B 39/02 | (2006.01) |

(52) U.S. Cl.
USPC ....................... 315/291; 315/209 R

(58) Field of Classification Search
None
See application file for complete search history.

(56) References Cited

U.S. PATENT DOCUMENTS

| 4,777,516 | A  | * | 10/1988 | Deschler et al. | ................ 257/93 |
| 6,147,458 | A  |   | 11/2000 | Bucks | |
| 6,949,892 | B2 | * | 9/2005 | Horiuchi et al. | ............. 315/308 |
| 7,321,206 | B2 |   | 1/2008 | Kang | |
| 2003/0042437 | A1 | | 3/2003 | Worley | |
| 2004/0195978 | A1 | | 10/2004 | Horiuchi | |
| 2005/0057185 | A1 | | 3/2005 | Tanabe | |
| 2005/0265035 | A1 | * | 12/2005 | Brass et al. | ................... 362/451 |
| 2007/0152604 | A1 | | 7/2007 | Tatsumi | |
| 2007/0159750 | A1 | | 7/2007 | Peker | |
| 2008/0018261 | A1 | | 1/2008 | Kastner | |
| 2008/0122418 | A1 | | 5/2008 | Briere | |
| 2008/0290819 | A1 | | 11/2008 | Hoepfner | |
| 2009/0015174 | A1 | * | 1/2009 | Huang et al. | ................. 315/250 |
| 2010/0001663 | A1 | | 1/2010 | Wu | |

(Continued)

FOREIGN PATENT DOCUMENTS

| CN | 1984518 | 6/2007 |
| CN | 101447731 | 6/2009 |

(Continued)

OTHER PUBLICATIONS

English language abstract of JP 2008-210537, published Sep. 11, 2008.

(Continued)

*Primary Examiner* — Douglas W Owens
*Assistant Examiner* — Dedei K Hammond
(74) *Attorney, Agent, or Firm* — DLA Piper LLP (US)

(57) ABSTRACT

According to one embodiment, an LED lighting device comprises at least one normally-on type switching element, an output generation unit that generates DC output by an on-off operation of the switching element, a semiconductor light emitting element that is lit by the DC output generated by the output generation unit, and a driving control unit that causes the switching element to perform an off operation using a current passed through the semiconductor light emitting element.

16 Claims, 12 Drawing Sheets

(56) References Cited

U.S. PATENT DOCUMENTS

| | | |
|---|---|---|
| 2010/0090618 A1 | 4/2010 | Veltman |
| 2010/0117656 A1 | 5/2010 | Snelten |
| 2011/0050129 A1 | 3/2011 | Rudolph |
| 2011/0085335 A1 | 4/2011 | Osawa |
| 2011/0089846 A1 | 4/2011 | Ido |
| 2011/0101880 A1* | 5/2011 | Ribarich ............ 315/250 |
| 2011/0109230 A1 | 5/2011 | Simi |

FOREIGN PATENT DOCUMENTS

| | | |
|---|---|---|
| JP | 62-178168 | 8/1987 |
| JP | 09-074224 | 3/1997 |
| JP | 10-46324 | 2/1998 |
| JP | 10-149888 | 6/1998 |
| JP | 11-087072 | 3/1999 |
| JP | 2000-260578 | 9/2000 |
| JP | 2001-028461 | 1/2001 |
| JP | 2001-210478 | 8/2001 |
| JP | 2001-215913 | 8/2001 |
| JP | 2002-231471 | 8/2002 |
| JP | 2003-157986 | 5/2003 |
| JP | 2004-119078 | 4/2004 |
| JP | 2004-242475 | 8/2004 |
| JP | 2004-327152 | 11/2004 |
| JP | 2005-005112 | 1/2005 |
| JP | 2005-011739 | 1/2005 |
| JP | 2005-129512 | 5/2005 |
| JP | 2005-142137 | 6/2005 |
| JP | 2006-066467 | 3/2006 |
| JP | 2006-108117 | 4/2006 |
| JP | 2006-269349 | 10/2006 |
| JP | 2006-525665 | 11/2006 |
| JP | 2006-351496 | 12/2006 |
| JP | 2007-6658 | 1/2007 |
| JP | 2007-59635 | 3/2007 |
| JP | 2007-103232 | 4/2007 |
| JP | 2007-115594 | 5/2007 |
| JP | 2007-142057 | 6/2007 |
| JP | 2007-165001 | 6/2007 |
| JP | 2007-234415 | 9/2007 |
| JP | 2007-281424 | 10/2007 |
| JP | 2007-538378 | 12/2007 |
| JP | 2008-053695 | 3/2008 |
| JP | 2008-210537 | 9/2008 |
| JP | 2008-310963 | 12/2008 |
| JP | 2009-10100 | 1/2009 |
| JP | 2009-33098 | 2/2009 |
| JP | 2009-189170 | 8/2009 |
| JP | 2009-194182 | 8/2009 |
| JP | 2009-218528 | 9/2009 |
| JP | 2009-266599 | 11/2009 |
| JP | 2010-021109 | 1/2010 |
| JP | 2010-040878 | 2/2010 |
| JP | 2010-110157 | 5/2010 |
| KR | 10-0884279 | 2/2009 |
| TW | 2010 17042 | 5/2010 |
| WO | WO 00/02421 | 1/2000 |
| WO | WO 00/70920 | 11/2000 |
| WO | WO 2005/115058 | 12/2005 |
| WO | WO 2008/132661 | 11/2008 |
| WO | WO 2009/001279 | 12/2008 |
| WO | WO 2009/001198 | 1/2009 |
| WO | WO 2009/089919 | 7/2009 |
| WO | WO 2010/005291 | 1/2010 |
| WO | WO 2010/007985 | 1/2010 |
| WO | WO 2010/050659 | 6/2010 |

OTHER PUBLICATIONS

Machine English language translation of JP 2008-210537, published Sep. 11, 2008.
English language abstract of JP-2008-053695 published Mar. 6, 2008.
Machine English language translation of JP-2008-053695 published Mar. 6, 2008.
English language abstract of JP-2007-538378 published Dec. 27, 2007.
Machine English language translation of JP-2007-538378 published Dec. 27, 2007.
English language abstract of JP 2005-11739 published Jan. 13, 2005.
Machine English language translation of JP 2005-11739 published Jan. 13. 2005.
English language abstract of JP 11-087072 published Mar. 30, 1999.
Machine English language translation of JP 11-087072 published Mar. 30, 1999.
English Language Abstract of JP 2009-218528 Published Sep. 24, 2009.
English Language Translation of JP 2009-218528 Published Sep. 24, 2009.
English Language Abstract of JP 2004-119078 Published Apr. 15, 2004.
English Language Translation of JP 2004-119078 Published Apr. 15, 2004.
English Language Abstract of JP 2007-6658 Published Jan. 11, 2007.
English Language Translation of JP 2007-6658 Published Jan. 11, 2007.
English Language Abstract of JP 2003-157986 Published May 30, 2003.
English Language Translation of JP 2003-157986 Published May 30, 2003.
English Language Abstract of JP 2008-310963 Published Dec. 25, 2008.
English Language Translation of JP 2008-310963 Published Dec. 25, 2008.
International Search Report issued in PCT/JP2009/055871 on Jun. 9, 2009.
English Language Abstract of JP 2002-231471 Published Aug. 15, 2002.
English Language Translation of JP 2002-231471 Published Aug. 15, 2002.
English Language Abstract of JP 2004-327152 Published Nov. 18, 2004.
English Language Translation of JP 2004-327152 Published Nov. 18, 2004.
English Language Abstract of JP 2005-129512 Published May 19, 2005.
English Language Translation of JP 2005-129512 Published May 19, 2005.
English Language Abstract of JP 2007-234415 Published Sep. 13, 2007.
English Language Translation of JP 2007-234415 Published Sep. 13, 2007.
English Language Abstract of JP 2001-210478 Published Aug. 3, 2001.
English Language Translation of JP 2001-210478 Published Aug. 3, 2001.
English Language Abstract of JP 2006-269349 Published Oct. 5, 2006.
English Language Translation of JP 2006-269349 Published Oct. 5, 2006.
International Search Report issued in PCT/JP2009/055873 on Jun. 9, 2009.
Japanese Office Action issued in JP 2008-076837 on Jul. 6, 2010.
English Translation of Japanese Office Action issued in JP 2008-076837 on Jul. 6, 2010.
English Language Abstract of JP 2006-108117 published Apr. 20, 2006.
Machine Translation of JP 2006-108117 published Apr. 20, 2006.
English Language Abstract of JP 2008-281424 published Nov. 20, 2008.
Machine Translation of JP 2008-281424 published Nov. 20, 2008.
Japanese Office Action issued in JP 2008-076835 on Aug. 24, 2010.
English Translation of Japanese Office Action issued in JP 2008-076835 on Aug. 24, 2010.
English Language Abstract of JP 2005-142137 published Jun. 2, 2005.
English Language Translation of JP 2005-142137 published Jun. 2, 2005.

(56) References Cited

OTHER PUBLICATIONS

English Language Abstract of JP 2009-10100 published Jan. 15, 2009.
English Language Translation of JP 2009-10100 published Jan. 15, 2009.
English Language Abstract of JP 2000-260578 published Sep. 22, 2000.
English Language Translation of JP 2000-260578 published Sep. 22, 2000.
English Language Abstract of JP 2010-110157 published May 13, 2010.
English Language Translation of JP 2010-110157 published May 13, 2010.
Japanese Office Action issued on Nov. 21, 2011 in JP 2010-015159.
English Language Translation of Japanese Office Action issued on Nov. 21, 2011 in JP 2010-015159.
English Language Abstract of JP 2009-266599 published Nov. 12, 2009.
English Language Translation of JP 2009-266599 published Nov. 12, 2009.
English Language Abstract of JP 10-149888 published Jun. 6, 1998.
English Language Translation of JP 10-149888 published Jun. 6, 1998.
English Language Abstract of JP 2009-033098 published Feb. 12, 2009.
English Language Translation of JP 2009-033098 published Feb. 12, 2009.
English Language Abstract of WO 2009/089919 published Jul. 23, 2009.
English Language Abstract of JP 2009-189170 published Aug. 20, 2009.
English Language Translation of JP 2009-189170 published Aug. 20, 2009.
English Language Abstract of JP 10-046324 published Feb. 17, 1998.
English Language Translation of JP 10-046324 published Feb. 17, 1998.
English Language Abstract of JP 2007-059635 published Mar. 8, 2007.
English Language Translation of JP 2007-059635 published Mar. 8, 2007.
English Language Abstract of JP 2007-142057 published Jun. 7, 2007.
English Language Translation of JP 2007-142057 published Jun. 7, 2007.
European Search Report issued in EP 11166087 on Oct. 20, 2011.
European Search Report issued in EP 11177418 on Dec. 6, 2011.
English Language Abstract of TW 2010-17042 published on May 1, 2010.
Extended European Search Report issued in EP 11171024 on Dec. 1, 2011.
Related U.S. Appl. No. 13/162,678.
Related U.S. Appl. No. 13/169,748.
Related U.S. Appl. No. 13/218,767.
Extended Search Report issued in EP 10190380 on Jan. 2, 2013.
Chinese Office Action issued in CN 201010540958 on Jan. 31, 2013.
English Language Translation of Chinese Office Action issued in CN 201010540958 on Jan. 31, 2013.
English language abstract for CN 1984518 published Jun. 20, 2007.
English language abstract for CN 101447731 published Jun. 3, 2009.
Korean Office Action issued in KR 10-2011-0060215 on Sep. 1, 2012.
English Language Translation of Korean Office Action issued in KR 10-2011-0060215 on Sep. 1, 2012.
English Language Abstract of KR 10-0884279 published Feb. 17, 2009.
English Language Abstract of JP 2006-351496 published Dec. 28, 2006.
English Language Translation of JP 2006-351496 published Dec. 28, 2006.
English Language Abstract of JP 2010-021109 published Jan. 28, 2010.
English Language Translation of JP 2010-021109 published Jan. 28, 2010.
Japanese Office Action issued in JP2010-015159 on Nov. 7, 2012.
English Language Translation of Japanese Office Action issued in JP2010-015159 on Nov. 7, 2012.
English Language Translation of KR 10-2011-0060739 issued Oct. 24, 2012.
English Language Abstract of JP 2010-040878 published on Feb. 18, 2010.
English Language Translation of JP 2010-040878 published on Feb. 18, 2010.
Japanese Office Action issued in JP 2010-027398 on Apr. 23, 2013.
English Language Translation of Japanese Office Action issued in JP 2010-027398 on Apr. 23, 2013.
Japanese Office Action issued in JP 2010-064436 on Apr. 23, 2013.
English Language Translation of Japanese Office Action issued in JP 2010-064436 on Apr. 23, 2013.
English Language Abstract of JP 2001-028461 published Jan. 30, 2001.
English Language Translation of JP 2001-028461 published Jan. 30, 2001.
English Language Abstract of JP 2007-165001 published Jun. 28, 2007.
English Language Translation of JP 2007-165001 published Jun. 28, 2007.
English Language Abstract of JP 2007-103232 published Apr. 19, 2007.
English Language Translation of JP 2007-103232 published Apr. 19, 2007.
English Language Abstract of JP 2009-194182 published Aug. 27, 2009.
English Language Translation of JP 2009-194182 published Aug. 27, 2009.
English Language Abstract of JP 2006-066467 published Mar. 9, 2006.
English Language Translation of JP 2006-066467 published Mar. 9, 2006.
English Language Abstract of JP 09-074224 published Mar. 18, 1997.
English Language Translation of JP 09-074224 published Mar. 18, 1997.
English Language Abstract of JP 2001-215913 published Aug. 10, 2001.
English Language Translation of JP 2001-215913 published Aug. 10, 2001.
English Language Abstract of JP 2006-525665 published Nov. 9, 2006.
English Language Translation of JP 2006-525665 published Nov. 9, 2006.
U.S. Appl. No. 13/169,748.
U.S. Appl. No. 13/013,271.
U.S. Appl. No. 13/106,487.
U.S. Appl. No. 13/162,678.
Japanese Office Action issued in JP 2010-234641 on Mar. 6, 2014.
English Language Translation of Japanese Office Action issued in JP 2010-234641 on Mar. 6, 2014.
English Language Abstract and Translation of JP 2005-005112 published on Jan. 6, 2005.
English Language Abstract and Translation of JP 2004-242475 published on Aug. 26, 2004.
English Language Abstract of JP 62-178168 published on Aug. 5, 1987.
English Language Abstract and Translation of JP 2007-115594 published on May 10, 2007.
U.S. Appl. No. 13/218,767.

* cited by examiner

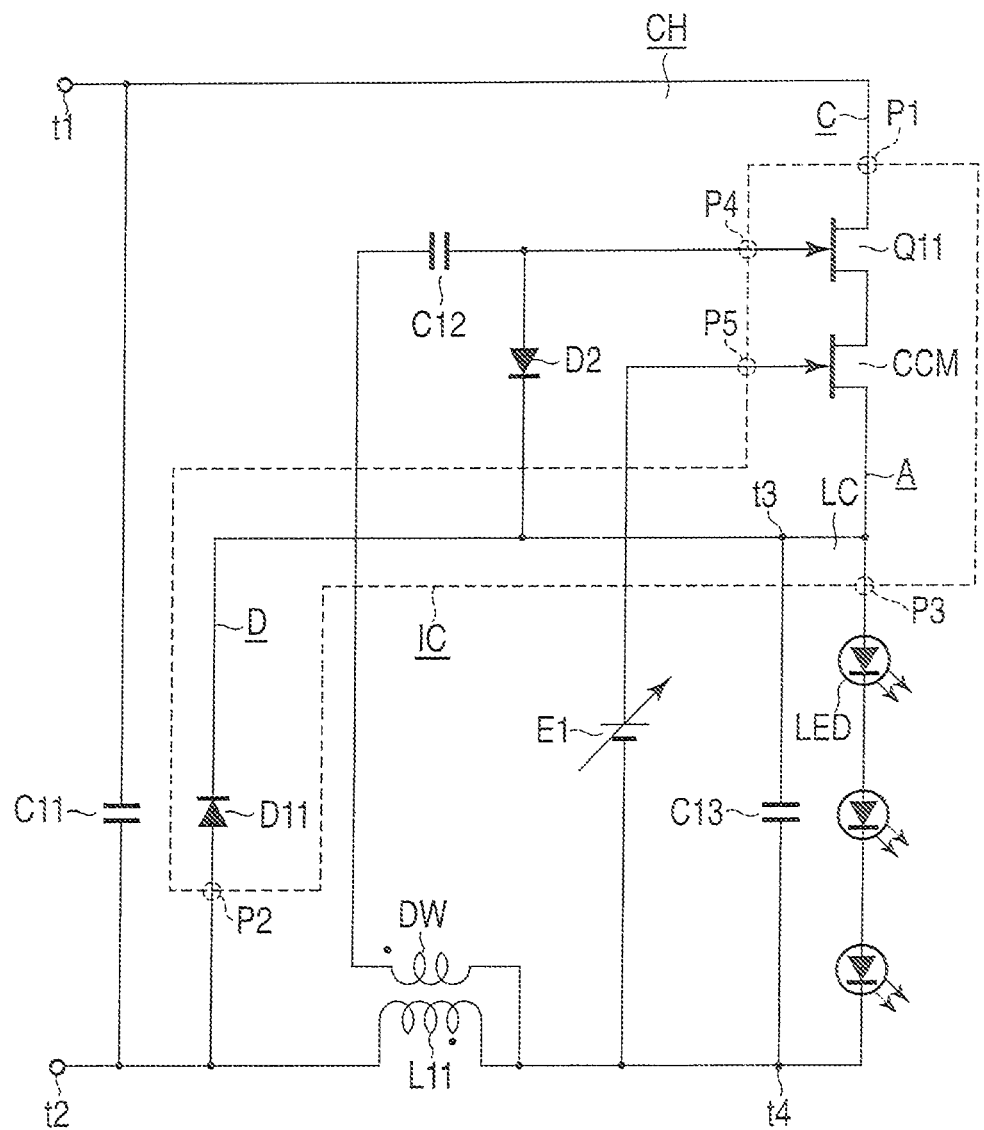
F I G. 14

LED LIGHTING DEVICE, ILLUMINATING DEVICE AND POWER SUPPLY THEREFORE HAVING A NORMALLY-ON TYPE SWITCHING ELEMENT

CROSS-REFERENCE TO RELATED APPLICATIONS

This application is based upon and claims the benefit of priority from Japanese Patent Applications No. 2009-256363, filed Nov. 9, 2009; No. 2010-027398, filed Feb. 10, 2010; No. 2010-064436, filed Match 19, 2010; and No. 2010-234641, filed Oct. 19, 2010; the entire contents of all of which are incorporated herein by reference.

FIELD

Embodiments described herein relate generally to an LED lighting device and an illuminating apparatus provided with the LED lighting device.

BACKGROUND

Recently, a device in which an LED element is used as a light source is in practical use with improvement of optical performance of a Light Emitting Diode (LED) element. For example, a DC LED lighting device in which a switching means is utilized is widely used as an LED lighting device that lights the LED element.

Conventionally, for example, a transistor made of an Si (silicon) semiconductor is used as the switching means (switching element) of the LED lighting device. A transistor in which a wide-bandgap semiconductor such as SiC (silicon carbide), GaN (gallium nitride) and diamond is used receives attention.

Generally a wide-gap semiconductor has a normally-on characteristic in which a current is passed when a gate voltage is zero. Examples of the semiconductor element in which the wide-gap semiconductor is used include a JFET (Junction type FET), an SIT (Static Induction Transistor), an MESFET (Metal-Semiconductor FET: Metal-Semiconductor-Field-Effect-Transistor), an HFET (Hetero junction Field Effect Transistor), an HEMT (High Electron Mobility Transistor), and a storage type FET.

In order to securely turn off the semiconductor element (hereinafter referred to as normally-on switch) having the normally-on characteristic, it is necessary for the LED lighting device to comprise a control circuit for negative gate voltage.

There is well known the fact that the LED lighting device having high circuit efficiency is obtained by lighting the LED element with a DC-DC converter. In the DC-DC converter, a switch element is driven using an induced electromotive force, which allows constant current control to be performed.

BRIEF DESCRIPTION OF THE DRAWINGS

FIG. 14 illustrates a configuration example of an LED lighting device according to an embodiment;

DETAILED DESCRIPTION

In general, according to one embodiment, an LED lighting device comprises at least one normally-on type switching element, an output generation unit that generates DC output by an on-off operation of the switching element, a semiconductor light emitting element that is lit by the DC output generated by the output generation unit, and a driving control unit that causes the switching element to perform an off operation using a current passed through the semiconductor light emitting element.

Embodiments will be described below with reference to the drawings.

First Embodiment

Figure 1:
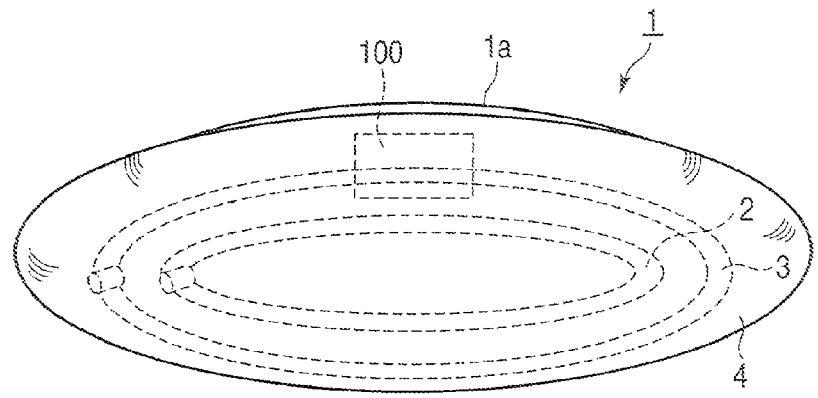
FIG. 1 illustrates an example of an illuminating apparatus according to an embodiment.

FIG. 1 is a perspective view illustrating an illuminating apparatus to which a power-supply device (LED lighting device) according to a first embodiment is applied. The illuminating apparatus comprising the power-supply device will briefly be described.

Referring to FIG. 1, an apparatus main body 1 comprises a disk-shaped base 1a. Ring LED illuminating lamps 2 and 3 having different diameters are concentrically disposed as a light source on the base 1a. A creamy-white shade 4 is mounted such that the LED illuminating lamps 2 and 3 are covered therewith. A power-supply device 100 is disposed in the apparatus main body 1. Although not illustrated, a reflective plate, a terminal, and wiring may be provided in the apparatus main body 1.

Figure 2:
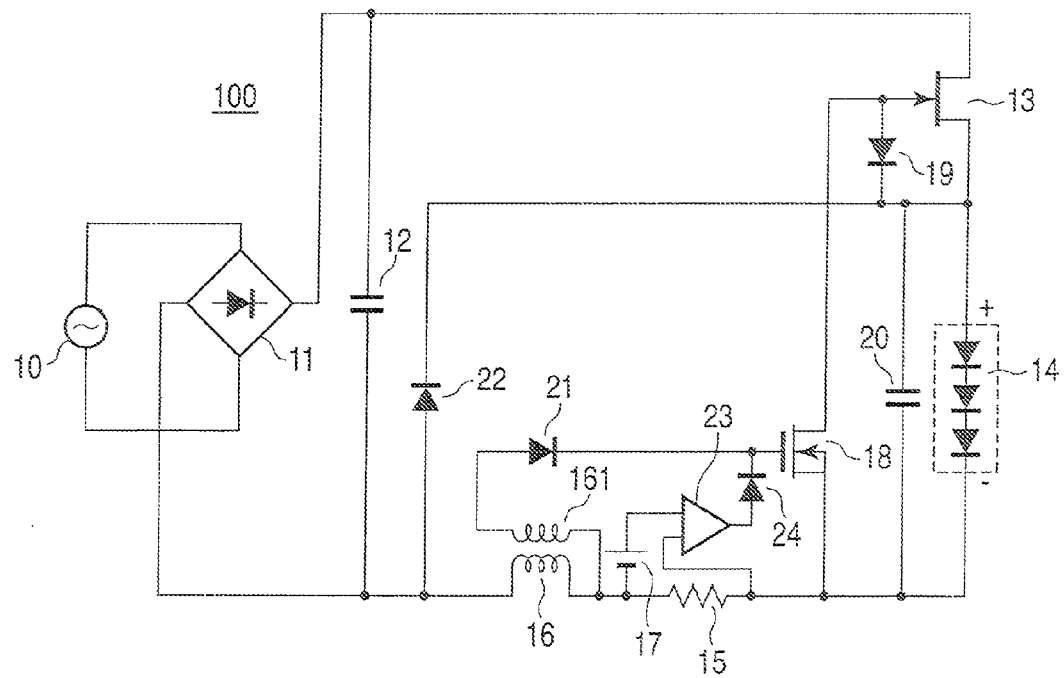
FIG. 2 illustrates a configuration example of an LED lighting device according to an embodiment.

FIG. 2 illustrates a schematic configuration of the power-supply device 100 that is incorporated in the apparatus main body 1 of the illuminating apparatus illustrated in FIG. 1.

Referring to FIG. 2, an AC power supply 10 comprises a commercial power supply (not illustrated). An input terminal of a full-wave rectifying circuit 11 is connected to the AC power supply 10. The full-wave rectifying circuit 11 generates output in which full-wave rectification is performed to an AC power from the AC power supply 10. A ripple current smoothing capacitor 12 is connected between positive and negative output terminals of the full-wave rectifying circuit 11.

For example, a normally-on type field effect transistor 13 made of GaN is connected as a switching element constituting a step-down chopper to the capacitor 12.

The field effect transistor 13 is formed by joining heterogeneous semiconductor materials having different bandgaps. The field effect transistor 13 comprises a two-dimensional electron gas layer at an interface. The field effect transistor 13 can realize high-speed switching and high sensitivity by an effect of the two-dimensional electron gas layer. The field effect transistor 13 is called an HEMT (High Electron Mobility Transistor).

In the field effect transistor 13, it is assumed that Vgs is a gate-source voltage and Vth (negative voltage) is a threshold of a gate voltage. The field effect transistor 13 is turned off for Vth>Vgs, and the field effect transistor 13 is turned on for Vth<Vgs.

A drain of the field effect transistor 13 is connected to an output terminal on a positive electrode side of the full-wave rectifying circuit 11. A source of the field effect transistor 13 is connected to the output terminal on the positive electrode side of the full-wave rectifying circuit 11 through an LED element group 14 and a series circuit of a resistive element 15 and an inductor 16. The LED element group 14 comprises a plurality of series-connected LED elements as a semiconductor light emitting element. A gate of the field effect transistor 13 is connected to a connection point of the resistive element 15 and the inductor 16 through a normally-off type field effect transistor 18. The normally-off type field effect transistor 18 that is the switching element constitutes a driving control unit.

A gate protecting diode 19 having a polarity illustrated in FIG. 2 is connected between the source and the gate of the field effect transistor 13.

The LED element group 14 corresponds to the LED illuminating lamps 2 and 3 illustrated in FIG. 1. When a current is passed through the LED element group 14, forward voltage having a polarity illustrated in FIG. 2 is generated at both ends of the LED element group 14. The field effect transistor 13 is turned off by applying a negative potential of the forward voltage between the source and the gate of the field effect transistor 13. A capacitor 20 is connected in parallel to the LED element group 14.

The inductor 16 comprises an auxiliary winding 161 that is coupled thereto. One end of the auxiliary winding 161 is connected to the connection point of the resistive element 15 and the inductor 16. The other end of the auxiliary winding 161 is connected to the gate of the field effect transistor 18 through a diode 21 having a polarity illustrated in FIG. 2. Electromagnetic energy is accumulated and emitted at the inductor 16 in association with an on-off operation of the field effect transistor 13, thereby generating the stepped-down DC output at both ends of the capacitor 20 through a flywheel diode 22. A self-excited circuit is configured to cause the field effect transistor 18 to perform the on-off operation by the output of the auxiliary winding 161 in synchronization with the accumulation and emission of the electromagnetic energy at the inductor 16.

A comparator 23 constituting a constant current control unit is connected to the resistive element 15. The comparator 23 is connected to the gate of the field effect transistor 18 through a diode 24 having a polarity illustrated in FIG. 2. In the comparator 23, a power supply 17 that generates a previously-set reference signal Vf is connected to one of input terminals. A load current passed through the resistive element 15 is input to the other terminal of the comparator 23. The comparator 23 compares the input load current and the reference signal Vf. As a result of the comparison, the comparator 23 forces the field effect transistor 18 to perform the on operation when the load current reaches the reference signal Vf.

Action of the first embodiment will be described below.

When the power supply is turned on with a power-supply switch (not illustrated), the forward voltage having the polarity illustrated in FIG. 2 is generated at both ends of the LED element group 14 through the field effect transistor 13 in the on state. When the current passed through the LED element group 14 becomes the reference signal Vf of the comparator 23 by turning on the field effect transistor 13, the field effect transistor 18 is turned on, and the negative potential is applied between the source and the gate of the field effect transistor 13 by the forward voltage of the LED element group 14. In such cases, Vth>Vgs is obtained to turn off the field effect transistor 13. At this point, the auxiliary winding 161 of the inductor 16 generates a signal to continuously turn on the field effect transistor 18. The field effect transistor 18 is turned off when the discharge of the inductor 16 is ended. In such cases, because of Vth<Vgs, the field effect transistor 13 is turned on again.

The similar operation is repeated, and the field effect transistor 13 is turned on and off by a switching operation of the field effect transistor 18. The stepped-down DC output is generated at both ends of the capacitor 20 through the flywheel diode 22 by the accumulation and emission of the electromagnetic energy at the inductor 16. The LED element group 14 is lit by the DC output.

When the load current passed through the resistive element 15 becomes the previously-set reference signal Vf of the comparator 23, the field effect transistor 18 is turned on while the field effect transistor 13 is turned off. Therefore, the load current is restricted, the load current passed through the LED element group 14 is controlled so as to be always matched with the reference signal Vf, and the constant current control is performed.

Accordingly, the normally-on type field effect transistor 13 is used as the switching element constituting the step-down chopper, and the field effect transistor 13 can be turned off by utilizing the forward voltage generated in the LED element group 14. Therefore, it is not necessary that a special power-supply circuit be incorporated to obtain the negative voltage used to turn off the normally-on type field effect transistor 13, and the number of components can be decreased. The circuit configuration can be simplified, the device can be miniaturized, and cost can be reduced.

The proper negative potential of Vth>Vgs (gate-source voltage) is obtained with respect to the threshold Vth of the gate voltage of the field effect transistor 13 by the forward voltage generated in the LED element group 14, so that the normally-on type field effect transistor can securely be turned off.

The normally-on type field effect transistor 13 made of GaN is used as the switching element. In the field effect transistor 13, high frequency can be achieved without degrading the efficiency. Therefore, capacities of impedance elements such as the inductor and the capacitor which constitute the circuit can be decreased, and modularization can be achieved by the further compact apparatus.

The light control of the LED element group 14 can be performed by changing the reference voltage Vf of the power supply 17 from an external manipulation. In such cases, for example, preferably a receiving circuit that receives a control signal is provided through insulating type input means such as a remote controller and a photocoupler on a side of a substrate (not illustrated) on which the LED element group 14 is mounted.

The number of series-connected LED elements is restricted. Therefore, when at least the restricted number of LED elements is required as the LED illuminating lamp in order to optimally set the forward voltage generated at both ends of the LED element group 14, the LED elements more than the proper number of LED elements are series-connected to the inductor 16.

Second Embodiment

A second embodiment will be described below.

Figure 3:
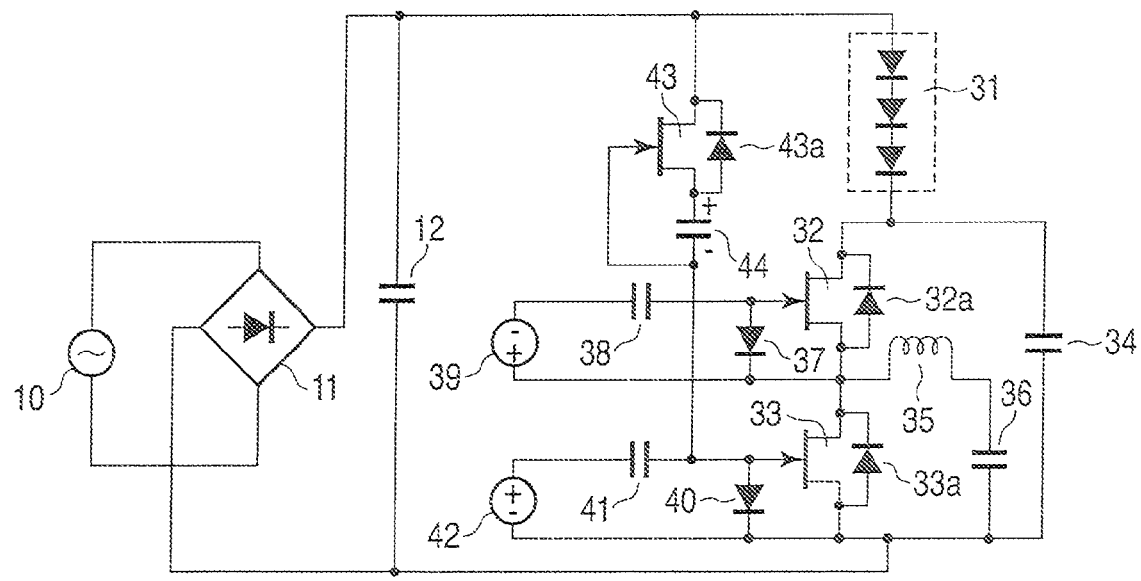
FIG. 3 illustrates a configuration example of an LED lighting device according to an embodiment.

FIG. 3 illustrates a schematic configuration of the second embodiment. In FIG. 3, the same components as those of FIG. 2 are designated by the same numerals.

In the second embodiment, a series circuit of normally-on type field effect transistors 32 and 33 made of GaN is connected as the switching element to both ends of the capacitor 12 connected between the positive and negative output terminals of the full-wave rectifying circuit 11. The series circuit of the field effect transistors 32 and 33 is series-connected to an LED element group 31 comprising a plurality of series-connected LED elements as the semiconductor light emitting element. While the threshold Vth of the gate voltage becomes negative, the field effect transistors 32 and 33 are turned off for Vth>Vgs (gate-source voltage) and turned on for Vth<Vgs. Diodes 32a and 33a having polarities illustrated in FIG. 3 are connected between the sources and the drains of the field effect transistors 32 and 33, respectively.

A capacitor 34 is parallel-connected to the series circuit of the field effect transistors 32 and 33, and a series circuit of an inductor 35 and a capacitor 36 is parallel-connected to the field effect transistor 33. A diode 37 having a polarity illustrated in FIG. 3 is connected between the gate and the source of the field effect transistor 32, and a first driving source 39 is connected to both ends of the diode 37 through a capacitor 38. A diode 40 having a polarity illustrated in FIG. 3 is connected between the gate and the source of the field effect transistor 33, and a second driving source 42 is connected to both ends of the diode 40 through a capacitor 41. The first and second driving sources 39 and 42 output positive and negative pulse signals through the capacitors 38 and 41, and first and second driving sources 39 and 42 alternately input negative voltage signals, to which half-wave rectification is performed by the diodes 37 and 40, between the gates and the sources of the field effect transistors 32 and 33.

A normally-on type field effect transistor 43 made of GaN is connected as the switching element that is the driving control unit to the connection point of the capacitor 12 and the LED element group 31. In the field effect transistor 43, the drain is connected to the connection point of the capacitor 12 and the LED element group 31, and the source is connected to the gate of the field effect transistor 33 through the capacitor 44. In the field effect transistor 43, the gate is connected to the connection point of the capacitor 44 and the gate of the field effect transistor 33. The field effect transistor 43 generates a negative potential at the capacitor 44 by the forward voltage of the LED element group 31 once the field effect transistor 43 is powered-on, and the field effect transistor 43 inputs the negative potential to the gate of the field effect transistor 33. A diode 43a having a polarity illustrated in FIG. 3 is connected between the source and the drain of the field effect transistor 43.

Action of the second embodiment will be described below.

When the power supply is turned on with a power-supply switch (not illustrated) to generate the forward voltage in the LED element group 31, a charge current is passed through the capacitor 44 through the field effect transistor 43 in the on state by the forward voltage, thereby charging the capacitor 44 in the polarity illustrated in FIG. 3. Therefore, the negative potential at the capacitor 44 is applied to the gate of the field effect transistor 33 to turn off the field effect transistor 33. Accordingly, a short circuit caused by the LED element group 31 during the power-on and the field effect transistors 32 and 33 in the on state is blocked to prevent such a trouble that the LED element group 31 is broken due to the passage of overcurrent. The charges of the capacitor 44 are discharged through the diode 43a of the field effect transistor 43.

Then the negative voltage signals are alternately input between the gates and the sources of the field effect transistors 32 and 33 through the diodes 37 and 40 by the outputs from the first and second driving sources 39 and 42. The field effect transistor 32 is turned on, and the negative voltage signal is input to the gate of the field effect transistor 33 by the second driving source 42 to turn off the field effect transistor 33. Therefore, the current is passed from the positive electrode side of the full-wave rectifying circuit 11 to the LED element group 31, the field effect transistor 32, the inductor 35, the capacitor 36, and the negative electrode side of the full-wave rectifying circuit 11, and the electromagnetic energy is accumulated in the inductor 35. At this point, when the negative voltage signal is input to the gate of the field effect transistor 32 by the first driving source 39 to turn off the field effect transistor 32, the electromagnetic energy of the inductor 35 continuously passes the charge current to the capacitor 36 through the diode 33a of the field effect transistor 33. The above-described operation becomes the operation of the step-down chopper in which the capacitor 36 is used as the output capacitor.

The field effect transistor 33 is turned on, and the negative voltage signal is input to the gate of the field effect transistor 32 by the first driving source 39 to turn off the field effect transistor 32. Therefore, the charge current is eliminated, and the discharge current is passed from the capacitor 36 through the inductor 35 and the field effect transistor 33 to accumulate the electromagnetic energy in the inductor 35. At this point, when the negative voltage signal is input to the gate of the field effect transistor 33 by the second driving source 42 to turn off the field effect transistor 33, the electromagnetic energy of the inductor 35 is passed through the diode 32a of the field effect transistor 32 and the capacitor 34. When the similar operation is repeated, the load current is continuously passed through the LED element group 31, and the LED element group 31 is lit by the load current.

Accordingly, once the power supply is powered-on, the charge current is passed to the capacitor 44 through the normally-on type field effect transistor 43 to charge the capacitor 44 by utilizing the forward voltage of the LED element group 31, and the normally-on type field effect transistor 33 constituting the switching circuit can be turned off by the negative potential at the capacitor 44. The effect similar to that of the first embodiment is obtained in the second embodiment. Because the short circuit caused by the turn-ons of the field effect transistors 32 and 33 can be blocked during the power-on, the passage of the overcurrent through the LED element group 31 can securely be eliminated to prevent the trouble such as the breakage of the LED element group 31 before happens.

(Modification)

Figure 4:
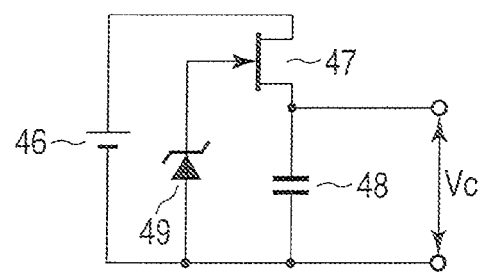
FIG. 4 illustrates a configuration example of a constant-voltage source according to an embodiment.

FIG. 4 illustrates a schematic configuration of a constant-voltage source applied to the second embodiment. The constant-voltage source illustrated in FIG. 4 can be applied as the power supply to the second embodiment. At this point, a drain of a normally-on type field effect transistor 47 is connected to an end on a positive electrode side of a DC power supply 46, and a source of the field effect transistor 47 is connected to an end on a negative electrode side of the DC power supply 46 through a capacitor 48. A zener diode 49 having a polarity illustrated in FIG. 4 is connected between a gate of the field effect transistor 47 and an end on the negative electrode side of the DC power supply 46. The zener diode 49 generates a constant voltage by a zener effect.

When the field effect transistor 47 is turned on, a constant voltage Vc is generated between both ends of the capacitor 48 by the Zener diode 49, so that the constant voltage can be used as the power supply.

Third Embodiment

A third embodiment will be described below.

Figure 5:
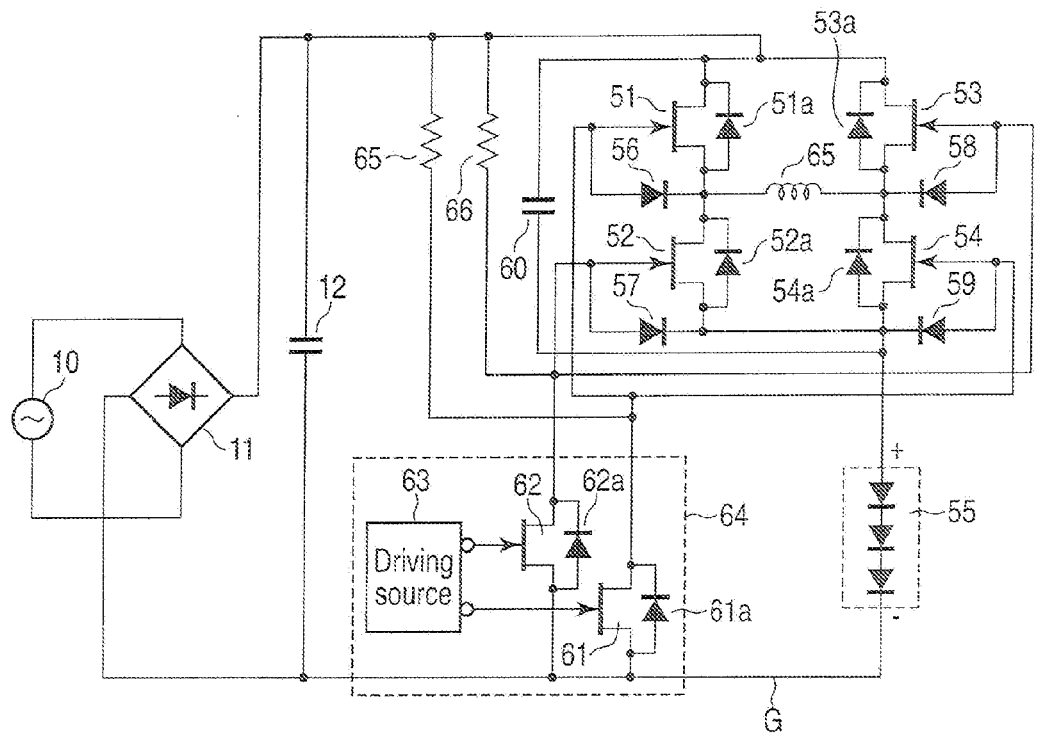
FIG. 5 illustrates a configuration example of an LED lighting device according to an embodiment.

FIG. 5 illustrates a schematic configuration of the third embodiment. In FIG. 5, the same components as those of FIG. 2 are designated by the same numerals.

In the third embodiment, a series circuit of normally-on type field effect transistors 51 and 52 made of GaN, a full-bridge circuit, and a series circuit of an LED element group 55 as the semiconductor light emitting element are connected as the switching element to both ends of the capacitor 12 connected to the positive and negative output terminals of the full-wave rectifying circuit 11. The series circuit of normally-on type field effect transistors 53 and 54 made of GaN is parallel-connected to the full-bridge circuit. The LED element group 55 comprises a plurality of series-connected LED elements as the semiconductor light emitting element. An inductor 65 is connected between the connection point of the field effect transistors 51 and 52 and the connection point of the field effect transistors 53 and 54.

While the threshold Vth of the gate voltage becomes negative, the normally-on type field effect transistors 51 to 54 are turned off for Vth>Vgs (gate-source voltage) and turned on for Vth<Vgs. Diodes 51a to 54a having polarities illustrated in FIG. 5 are connected between the sources and the drains of the field effect transistors 51 to 54, respectively. Gate protecting diodes 56 to 59 are connected between the gates and the sources of the field effect transistors 51 to 54, respectively. A capacitor 60 is parallel-connected to a bridge circuit of the field effect transistors 51 to 54.

When the current is passed through the LED element group 55, the LED element group 55 generates the forward voltage having polarity illustrated in FIG. 5 at both ends thereof, and a side of a ground G is put into the negative potential by the forward voltage. At this point, the negative potential on the side of the ground G is set so as to become the thresholds Vth of the gate voltages at the field effect transistors 51 to 54 or less.

The gates of the field effect transistors 51 and 54 are commonly connected and connected to the ground G through a normally-on type field effect transistor 61 made of GaN as the driving control unit. Similarly the gates of the field effect transistors 52 and 53 are commonly connected and connected to the ground G through a normally-on type field effect transistor 62 made of GaN as the driving control unit.

Diodes 61a and 62a having polarities illustrated in FIG. 5 are connected between the sources and the drains of the field effect transistors 61 and 62, respectively. The field effect transistors 61 and 62 and a driving source 63 constitute a switch driving unit 64. The driving source 63 is connected to the gates of the field effect transistors 61 and 62, and the driving source 63 alternately inputs the negative voltage signal to the gates of the field effect transistors 61 and 62.

Resistive elements 65 and 66 put forward returns of the field effect transistors 52 to 54 from the off state to the on state.

Action of the third embodiment will be described below.

When the power supply is turned on with a power-supply switch (not illustrated), the field effect transistors 51 to 54 are turned on to generate the forward voltage having polarity illustrated in FIG. 5 in the LED element group 55, and the side of the ground G is put into the negative potential. At this point, the negative potential on the side of the ground G is applied to the gates of the field effect transistors 51 to 54 through the field effect transistors 61 and 62 in the on state, and the field effect transistors 51 to 54 are turned off. Therefore, the short circuit caused by the field effect transistors 51 to 54 and the LED element group 55 is blocked during the power-on.

Then the negative voltage signals are alternately input to the gates of the field effect transistors 61 and 62 by the output from the driving source 63 of the switch driving unit 64. The field effect transistors 51 and 54 are turned on, the field effect transistor 62 is turned on, and the negative potential on the side of the ground G is applied to the gates of the field effect transistors 52 and 53, thereby turning off the field effect transistors 52 and 53. Therefore, the current is passed from the positive electrode side of the full-wave rectifying circuit 11 through the field effect transistor 51, the inductor 65, the field effect transistor 54, and the LED element group 55, and the electromagnetic energy is accumulated in the inductor 65. At this point, the field effect transistor 61 is turned on, the negative potential on the side of the ground G is applied to the gates of the field effect transistors 51 and 54, and the field effect transistors 51 and 54 are turned off. Therefore, the electromagnetic energy of the inductor 65 passes the charge current through the diode 53a of the field effect transistor 53, the capacitor 60 and the diode 52a of the field effect transistor 52.

The field effect transistors 52 and 53 are turned on, the field effect transistor 61 is turned on, and the negative potential on the side of the ground G is applied to the gates of the field effect transistors 51 and 54, thereby turning off the field effect transistors 51 and 54. Therefore, the discharge current is passed from the capacitor 60 through the field effect transistor 53, the inductor 65, and the field effect transistor 52, and the electromagnetic energy is accumulated in the inductor 65. At this point, the field effect transistor 62 is turned on, the negative potential on the side of the ground G is applied to the gates of the field effect transistors 52 and 53, and the field effect transistors 52 and 53 are turned off. Therefore, the electromagnetic energy of the inductor 65 is passed as the charge current through the diode 51a of the field effect transistor 51, the capacitor 60 and the diode 54a of the field effect transistor 54. When the similar operation is repeated, the load current is continuously passed through the LED element group 55, and the LED element group 55 is lit by the load current.

Accordingly, once the power supply is powered-on, the side of the ground G is set to the negative potential by the forward voltage of the LED element group 55, and the normally-on type field effect transistors 51 to 54 constituting the switching circuit can be turned off by the negative potential on the side of the ground G. The effect similar to that of the first embodiment is obtained in the third embodiment. Because the short circuit caused by the turn-ons of the field effect transistors 51 to 54 can be blocked during the power-on, the passage of the overcurrent through the LED element group 55 can securely be eliminated to prevent the trouble such as the breakage of the LED element group 55 before happens.

Fourth Embodiment

A fourth embodiment will be described below.

Figure 6:
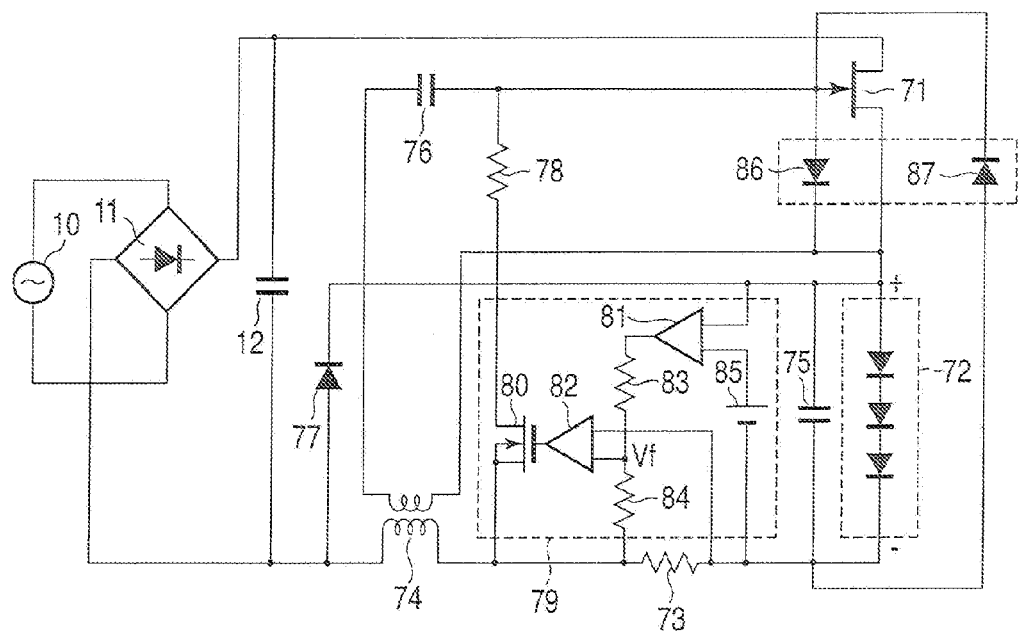
FIG. 6 illustrates a configuration example of an LED lighting device according to an embodiment.

FIG. 6 illustrates a schematic configuration of the fourth embodiment. In FIG. 6, the same components as those of FIG. 2 are designated by the same numerals.

In the fourth embodiment, similarly to the first embodiment, a normally-on type field effect transistor 71 made of GaN is connected as the switching element constituting the step-down chopper to the capacitor 12.

In the field effect transistor 71, the threshold Vth of the gate voltage is a negative voltage. The field effect transistor 71 is turned off for Vth>Vgs (gate-source voltage), and the field effect transistor 71 is turned on for Vth<Vgs. The drain of the field effect transistor 71 is connected to the output terminal on the positive electrode side of the full-wave rectifying circuit 11. The source of the field effect transistor 71 is connected to the output terminal on the positive electrode side of the full-wave rectifying circuit 11 through an LED element group 72 and a series circuit of a resistive element 73 and an inductor 74. The LED element group 72 comprises a plurality of series-connected LED elements as the semiconductor light emitting element.

The LED element group 72 corresponds to the LED illuminating lamps 2 and 3 illustrated in FIG. 1. When the load current is passed through the LED element group 72, the forward voltage having the polarity illustrated in FIG. 6 is generated at both ends of the LED element group 72. A capacitor 75 is connected in parallel to the LED element group 72.

The inductor 74 comprises an auxiliary winding 741 that is coupled thereto. One end of the auxiliary winding 741 is connected to the gate of the field effect transistor 71 through the capacitor 76. The other end of the auxiliary winding 741 is connected to the connection point of the field effect transistor 71 and the LED element group 72. The electromagnetic energy is accumulated and emitted at the inductor 74 in association with the on-off operation of the field effect transistor 71, thereby generating the stepped-down DC output at both ends of the capacitor 75 through a flywheel diode 77.

A self-excited circuit is configured such that the field effect transistor 71 is turned off by generating the negative potential of Vth>Vgs between the source and the gate of the field effect transistor 71 from the output of the auxiliary winding 741 in synchronization with the accumulation and emission of the electromagnetic energy at the inductor 74. For example, a normally-on type diode made of GaN is used as the flywheel diode 77.

The gate of the field effect transistor 71 is connected to the connection point of the resistive element 73 and the inductor 74 through a resistive element 78 that is a current-limiting resistance and a normally-off type field effect transistor 80 that is the switching element.

The field effect transistor 80, comparators 81 and 82, resistive elements 83 and 84, and a power supply 85 constitute an oscillation stopping unit 79 that is the driving control unit. In the comparator 81, one of input terminals is connected to the connection point of the field effect transistor 71 and the LED element group 72, and the other input terminal is connected to the power supply 85, and the output terminal is connected to the connection point of the resistive element 73 and the inductor 74 through the resistive elements 83 and 84.

The comparator 81 acts as an operational amplifier, and the comparator 81 generates the reference signal Vf at the connection point of the resistive elements 83 and 84 in order to detect the state, in which the forward voltage (load voltage) at the LED element group 72 becomes lower than the threshold Vth by the setting of the power supply 85, as an abnormal state. In the comparator 82, one of input terminals is connected to the connection point of the LED element group 72 and the resistive element 73, the other input terminal is connected to the connection point of the resistive elements 83 and 84, and the output terminal is connected to the gate of the field effect transistor 80. The comparator 82 turns on the field effect transistor 80 based on the comparison result of the current passed through the resistive element 73 and the reference signal Vf.

Diodes 86 and 87 constitute a gate voltage clamping circuit that clamps the gate voltage at the field effect transistor 71. The gate voltage at the field effect transistor 71 is clamped using the forward voltage at the LED element group 72.

Action of the fourth embodiment will be described below.

When the power supply is turned on with a power-supply switch (not illustrated), the forward voltage having the polarity illustrated in FIG. 6 is generated at both ends of the LED element group 72 through the field effect transistor 71 in the on state. When the field effect transistor 71 is turned on, the current is passed to the inductor 74 through the LED element group 72. Therefore, the electromagnetic energy is accumulated in the inductor 74 while the output is generated by the auxiliary winding 741, and the output is input to the gate of the field effect transistor 71 through the capacitor 76. In such cases, the negative potential of Vth>Vgs is generated between the source and the gate of the field effect transistor 71 by the output of the auxiliary winding 741 to turn off the field effect transistor 71.

At this point, the electromagnetic energy accumulated in the inductor 74 is emitted, the input from the auxiliary winding 741 is eliminated, and the Vth<Vgs is obtained, thereby turning on the field effect transistor 71.

The similar operation is repeated, and the field effect transistor 71 is turned on and off by the output of the auxiliary winding 741 in synchronization with the accumulation and emission of the electromagnetic energy at the inductor 74. At the same time, the stepped-down DC output is generated at both ends of the capacitor 75 through the flywheel diode 77 by the accumulation and emission of the electromagnetic energy at the inductor 74. The LED element group 72 is lit by the DC output.

On the other hand, the comparator 81 acts as the operational amplifier to output the reference signal Vf to the connection point of the resistive elements 83 and 84. At this point, the load current passed through the resistive element 73 according to the forward voltage (load voltage) of the LED element group 72 is input to the comparator 82. The comparator 82 compares the load current and the reference signal Vf. The comparator 82 generates the output to turn on the field effect transistor 80, when a determination that the load current is smaller than the reference signal Vf is made, that is, when a determination that the forward voltage (load voltage) at the LED element group 72 corresponding to the load current is lower than the threshold Vth is made from the comparison result. Therefore, the negative potential of the forward voltage at the LED element group 72 is applied between the source and the gate of the field effect transistor 71, and the field effect transistor 71 is turned off to stop the self-excited oscillation.

Accordingly, the effect similar to that of the first embodiment can also be obtained in the fourth embodiment. When the determination that the forward voltage (load voltage) at the LED element group 72 is lower than the threshold Vth is made, the field effect transistor 71 can forcedly be turned off to stop the self-excited oscillation. Therefore, the circuit protection can be realized such that the circuit can be prevented from going out of control due to the abnormal decrease of the forward voltage at the LED element group 72.

The self-excited oscillation can be stopped by changing the setting of the reference signal Vf, when the forward voltage (load voltage) at the LED element group 72 becomes higher than a predetermined forward voltage (load voltage).

The embodiment is not limited to the above embodiments, but various modifications can be made without departing from the scope at the implementation phase. For example, in the embodiments, the normally-on type field effect transistor made of GaN is applied. Alternatively, another wide-bandgap semiconductor made of SiC may be applied. In the embodiments, the LED element is used as the semiconductor light emitting element. However, the embodiment can be applied to another semiconductor light emitting element such as a laser diode.

In one embodiment, the power-supply device (LED lighting device) may comprise a switching element that is formed by a normally-on type field effect transistor, and a driving control unit that can turn off the field effect transistor by applying the negative potential of Vth>Vgs (gate-source voltage) with respect to the threshold Vth of the gate voltage at the field effect transistor using the forward voltage generated in the semiconductor light emitting element.

In one embodiment, the power-supply device may comprise a driving control unit that can turn off the field effect transistor when the forward voltage generated in the semiconductor light emitting element is lower than the threshold Vth or higher than a predetermined voltage.

In one embodiment, the power-supply device may comprise a driving control unit that comprises a normally-on type field effect transistor.

According to the first to fourth embodiments, because the forward voltage generated in the semiconductor light emitting element is used to turn off the normally-on type switching element, it is not necessary to incorporate the particular circuit in the device, and the device can be miniaturized to reduce the cost.

According to the first to fourth embodiments, the proper negative potential is obtained by the forward voltage generated in the semiconductor light emitting element, so that the normally-on type field effect transistor can securely be turned off.

According to the first to fourth embodiments, the self-excited oscillation of the normally-on type field effect transistor can be stopped to realize the circuit protection.

Fifth Embodiment

Figure 7:
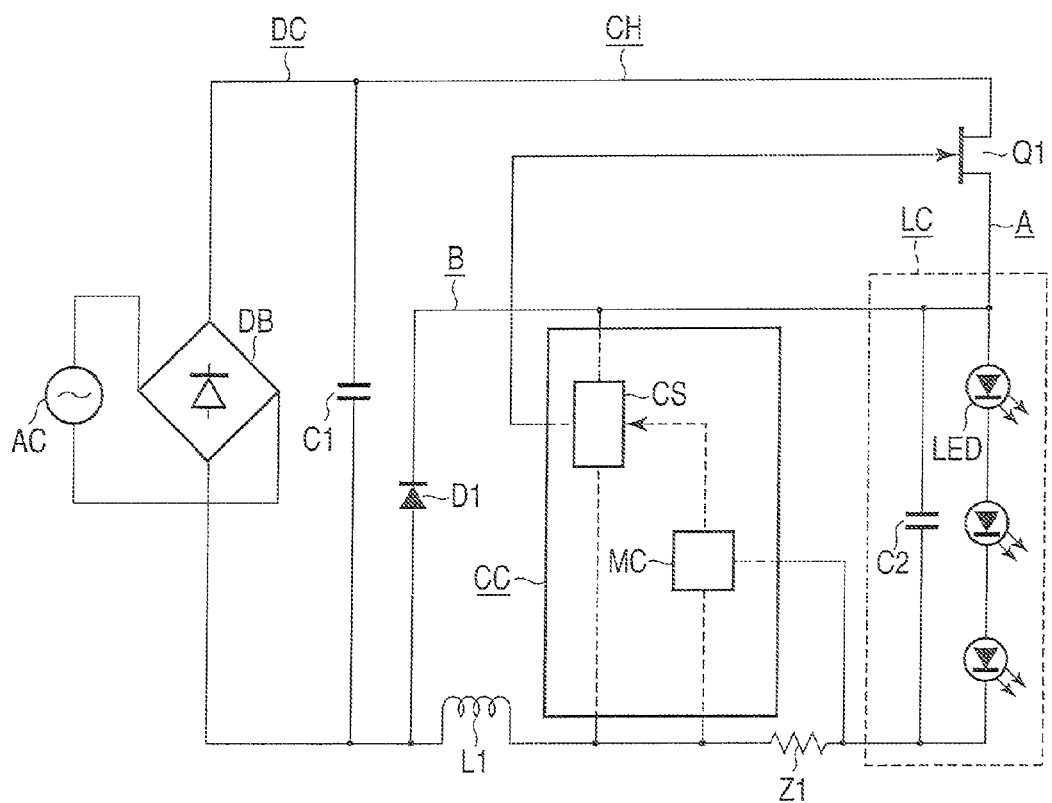
FIG. 7 illustrates a configuration example of an LED lighting device according to an embodiment.

An LED lighting device according to a fifth embodiment will be described with reference to FIG. 7.

The LED lighting device of the fifth embodiment comprises a DC power supply DC, a chopper CH, a load circuit LC, and a control circuit CC.

The DC power supply DC may have any configuration. For example, the DC power supply DC is mainly formed by a rectifying circuit DB, and desirably the DC power supply DC may comprise a smoothing circuit that comprises a smoothing capacitor C1. In the fifth embodiment, preferably the rectifying circuit DB is formed by a bridge-type rectifying circuit, and the rectifying circuit DB performs full-wave rectification of an AC voltage of an AC power supply AC, for example, a commercial AC power supply to obtain a DC voltage.

In the fifth embodiment, the chopper CH is formed by a non-isolated type step-down chopper. A power unit of the chopper CH, that is, a circuit unit through which an electric power supplied to the load is passed comprises a normally-on switch Q1, an inductor L1, a free-wheel diode D1, and a current detecting impedance element Z1. The power unit can be divided into a first circuit A and a second circuit B from the viewpoint of circuit operation.

The first circuit A accumulates the electromagnetic energy in the inductor L1 from the DC power supply DC. The first circuit A has a configuration in which a series circuit including the normally-on switch Q1, the load circuit LC, and the inductor L1 is connected to the DC power supply DC. When the normally-on switch Q1 is turned on, an increased current is passed from the DC power supply DC to accumulate the electromagnetic energy in the inductor L1.

The second circuit B emits the electromagnetic energy accumulated in the inductor L1. The second circuit B has a configuration in which a series circuit including the free-wheel diode D1 and the load circuit LC is connected to the inductor L1. A decreased current is passed from the inductor L1 when the normally-on switch Q1 is turned off.

Various wide-gap semiconductors described in the background art can be used as the normally-on switch Q1. The HEMT in which a GaN substrate is utilized is used in the fifth embodiment. Accordingly, the normally-on switch Q1 is a field effect wide-gap semiconductor that comprises a drain, a source, and a gate. The normally-on switch Q1 has an extremely excellent potential compared with a wide-spread Si semiconductor. For example, the chopper can be operated at an operating frequency as high as gigahertz. Therefore, because the extremely compact inductor L1 can be implemented, the whole of the LED lighting device can extremely be miniaturized.

The inductor L1 accumulates the electromagnetic energy supplied from the DC power supply DC and emits the electromagnetic energy. Therefore, unlike the conventional technique, it is not necessary to provide a secondary winding. Accordingly, the structure of the inductor L1 can be simplified to contribute to the miniaturization.

The free-wheel diode D1 is a means for providing a current pathway, that is, the second circuit B in order to emit and regenerate the electromagnetic energy accumulated in the inductor L1. Switching diodes such as a Schottky barrier diode and a PIN diode can be used as the free-wheel diode D1 according to the operating frequency of the chopper CH.

The current detecting impedance element Z1 detects the increased current and the decreased current while being inserted in a position on the circuit through which both the increased current and the decreased current are passed, that is, a line portion that is shared by the first circuit A and the second circuit B. For example, the current detecting impedance element Z1 is formed by a resistor having a small resistance value.

For a step-up chopper, the chopper CH can comprise the first circuit A and the second circuit B. In the first circuit A, the series circuit of the inductor L1 and the normally-on switch Q1 is connected to the DC power supply DC. In the second circuit B, the series circuit of the inductor L1, the free-wheel diode D1, and the load circuit LC is connected to the DC power supply DC. For the step-up/step-down chopper, the chopper CH can be configured as described above.

The load circuit LC is formed by a parallel circuit of a light emitting diode LED that is the load and an output capacitor C2. The load circuit LC is connected in a position on the circuit through which both the increased current and the decreased current are passed. The single light emitting diode LED is formed in the forward direction with respect to the current, or the plurality of light emitting diodes LED are provided while series-connected.

The control circuit CC comprises a control switch CS and a matching unit MC. The control circuit CC is activated by the supply of a proper control power supply to perform on-off control of the normally-on switch Q1. In the fifth embodiment, the control power supply is supplied from both ends of the load circuit LC to the control circuit CC.

The control switch CS switches the turn-on and turn-off of the normally-on switch Q1. That is, when the control switch CS is turned on to connect the gate of the normally-on switch Q1 to the connection point of the impedance element Z1 and the inductor L1, the voltage that is negative with respect to the source is applied to the gate of the normally-on switch Q1, thereby turning off the normally-on switch Q1. The normally-on switch Q1 is turned on, when the control switch CS is turned off to open the connection of the gate of the normally-on switch Q1 to the connection point of the impedance element Z1 and the inductor L1, or when the potential at the normally-on switch Q1 becomes equal to the potential at the source.

The matching unit MC is interposed between the impedance element Z1 and the control switch CS, and the matching unit MC turns on the control switch CS when the increased current reaches a first predetermined value. The matching unit MC turns off the control switch CS when the decreased current reaches a second predetermined value.

Accordingly, when the terminal voltage at the impedance element Z1 reaches the first predetermined value while the increased current is passed, because the matching unit MC turns on the control switch CS, the normally-on switch Q1 is turned off. When the terminal voltage at the impedance element Z1 reaches the second predetermined value while the decreased current is passed, because the matching unit MC turns off the control switch CS, the normally-on switch Q1 is turned on.

A circuit operation will be described below.

When the DC power supply DC is powered on, the normally-on switch Q1 of the chopper CH is turned on to pass the current from the DC power supply DC into the first circuit A, and the current is linearly increased. This is the increased current, and the electromagnetic energy is accumulated in the inductor L1. When the increased current is passed into the first circuit A, the terminal voltage at the impedance element Z1 is increased in proportion to the increased current. When the terminal voltage reaches the first predetermined value, the matching unit MC turns on the control switch CS.

Because the gate of the normally-on switch Q1 becomes the negative voltage when the control switch CS is turned on, the normally-on switch Q1 is turned off to cut off the increased current. Therefore, the electromagnetic energy accumulated in the inductor L1 is emitted, the passage of the current through the second circuit B is started to linearly decrease the current. This is the decreased current. When the decreased current reaches the second predetermined value, the matching unit MC turns off the control switch CS.

Because the application of the negative voltage to the gate of the normally-on switch Q1 is released when the control switch CS is turned off, the normally-on switch Q1 is turned on to start the passage of the increased current again. The DC-DC conversion operation is continued by repeating the above-described circuit operation.

Sixth Embodiment

Figure 8:
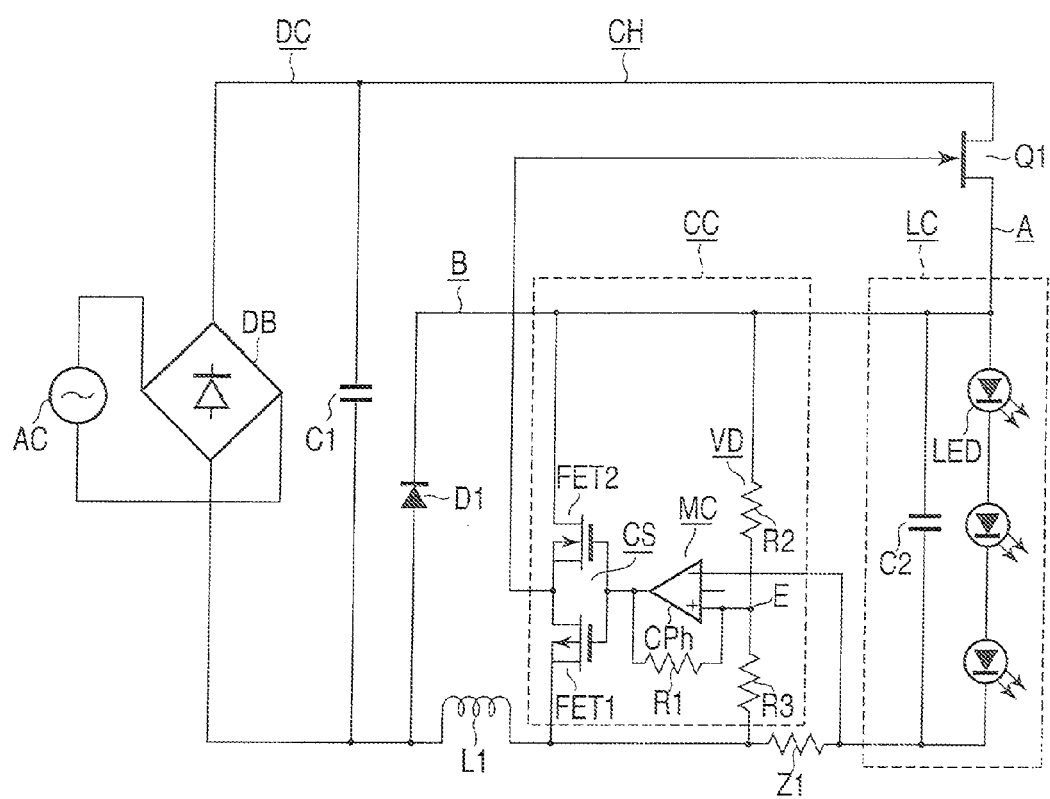
FIG. 8 illustrates a configuration example of an LED lighting device according to an embodiment.

An LED lighting device according to a sixth embodiment will be described below with reference to FIG. 8.

The sixth embodiment differs from the fifth embodiment in the control circuit CC. In FIG. 8, the same components as those of FIG. 7 are designated by the same numerals, and the descriptions thereof are omitted.

In the control circuit CC of the sixth embodiment, the control switch CS comprises a P-type FET 1 and an N-type FET 2, which are parallel-connected. The connection point of the drain of the P-type FET 1 and the source of the N-type FET 2 is connected to the gate of the normally-on switch Q1.

The matching unit MC is formed by a hysteresis comparator CPh. In the hysteresis comparator CPh, an inverting input terminal is connected to one end on the side of the load circuit LC of the impedance unit Z1, a non-inverting input terminal is connected to a reference potential E, and an output terminal is connected to the gates of the P-type FET 1 and the N-type FET 2. A feedback resistor R1 whose resistance value is previously adjusted is connected between the non-inverting input terminal and the output terminal. The reference potential E is formed at the connection point of the load circuit LC and a voltage divider VD. The voltage divider VD comprises resistors R2 and R3 that are parallel-connected to a series portion of the impedance unit Z1.

When the terminal voltage at the impedance unit Z1 reaches the first predetermined value while the normally-on switch Q1 is turned on to pass an increased current $I_U$ through the impedance unit Z1, a positive first predetermined voltage is input to the inverting input terminal of the hysteresis comparator CPh, and a negative maximum output voltage is output to the output terminal. Because the negative maximum output voltage is applied to the gate of the P-type FET 1 of the control switch CS, the P-type FET 1 is turned on. At this point, the N-type FET 2 remains in the off state.

Because the gate of the normally-on switch Q1 becomes the negative potential when the P-type FET 1 is turned on, the normally-on switch Q1 is turned off to cut off the increased current $I_U$. Therefore, a decreased current $I_D$ is passed from the inductor L1. Because the terminal voltage at the impedance unit Z1 in passing the decreased current $I_D$ is input to the inverting input terminal of the hysteresis comparator CPh after the terminal voltage of the increased current, when the terminal voltage at the impedance unit Z1 reaches the second predetermined value, a positive maximum voltage is output from the output terminal of the hysteresis comparator CPh. As a result, the P-type FET 1 is turned off while the N-type FET 2 is turned on.

When the P-type FET 1 is turned off while the N-type FET 2 is turned on, the normally-on switch Q1 is turned on, whereby the increased current is passed through the load circuit LC again. The chopper operation is performed by repeating the above-described operation.

Figure 9:
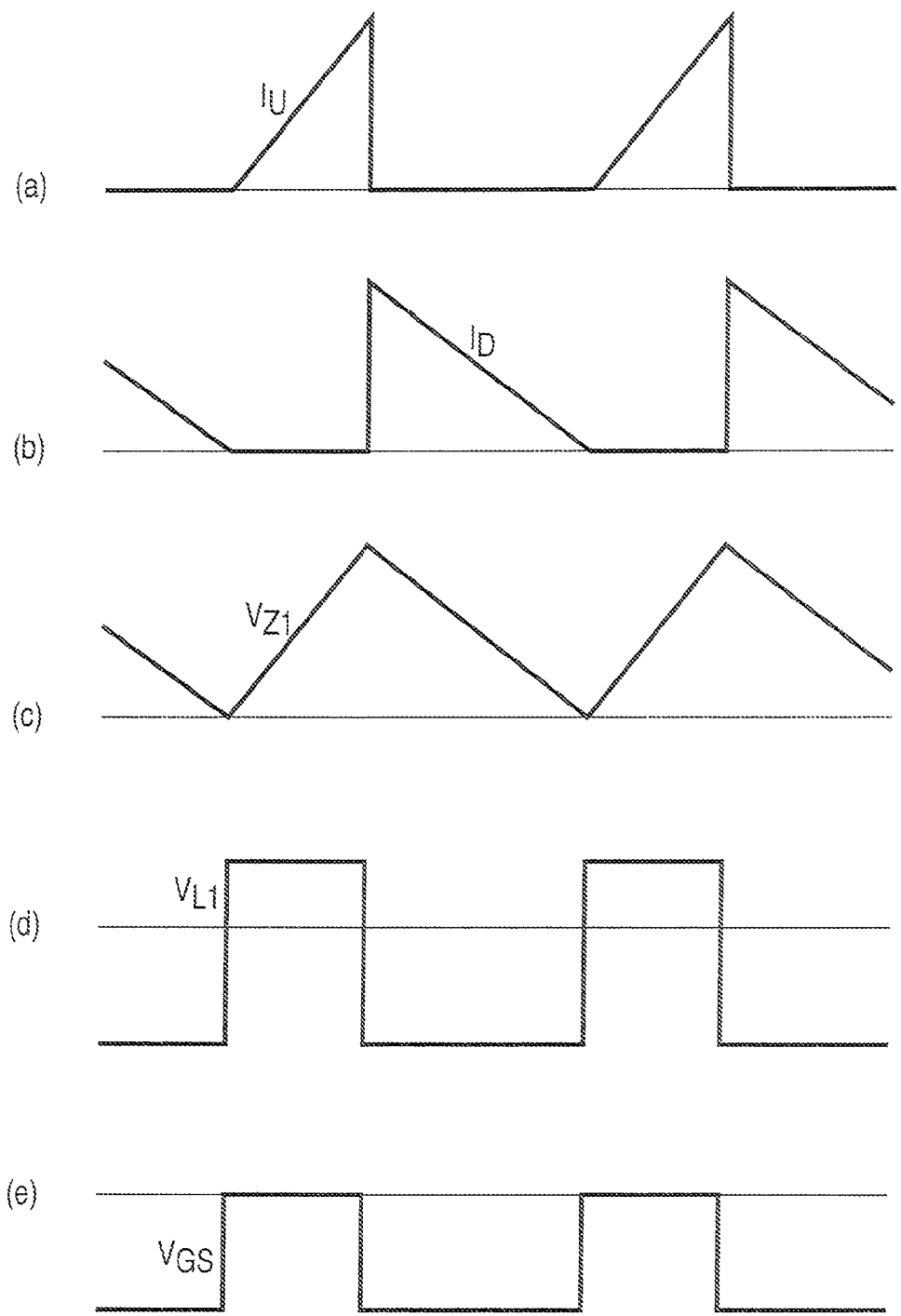
FIG. 9 illustrates an example of current and voltage waveforms in each unit of an LED lighting device according to an embodiment.

A relationship between a current and a voltage waveform in each unit of the sixth embodiment will be described with reference to FIG. 9. A part (a) of FIG. 9 illustrates a waveform of the increased current $I_U$, a part (b) illustrates a waveform of the decreased current $I_D$, a part (c) illustrates a waveform of a terminal voltage $V_{Z1}$ at the impedance unit, a part (d) illustrates a waveform of a voltage $V_{L1}$ at the inductor, and a part (e) illustrates a waveform of a gate voltage $V_{GS}$ at the normally-on switch. In the parts (a) to (e) of FIG. 9, time axes are matched with one another. In FIG. 9, a peak value of the increased current $I_U$ corresponds to the case where the increased current $I_U$ reaches the first predetermined value. The value of zero of the decreased current $I_D$ corresponds to the case where the decreased current $I_D$ reaches the second predetermined value.

The current waveform chart of FIG. 9 is an ideal waveform when the delay is not generated in the control. However, when a considerable delay is generated in the control during the cut-off of the increased current, the first predetermined value is located at a position that is lower than the peak value by a value corresponding to the control delay. In the state in which the decreased current reaches the second predetermined value, when a considerable delay is generated in the control, a current cut-off time corresponding to the control delay is generated between the decreased current and the next increased current.

Seventh Embodiment

Figure 10:
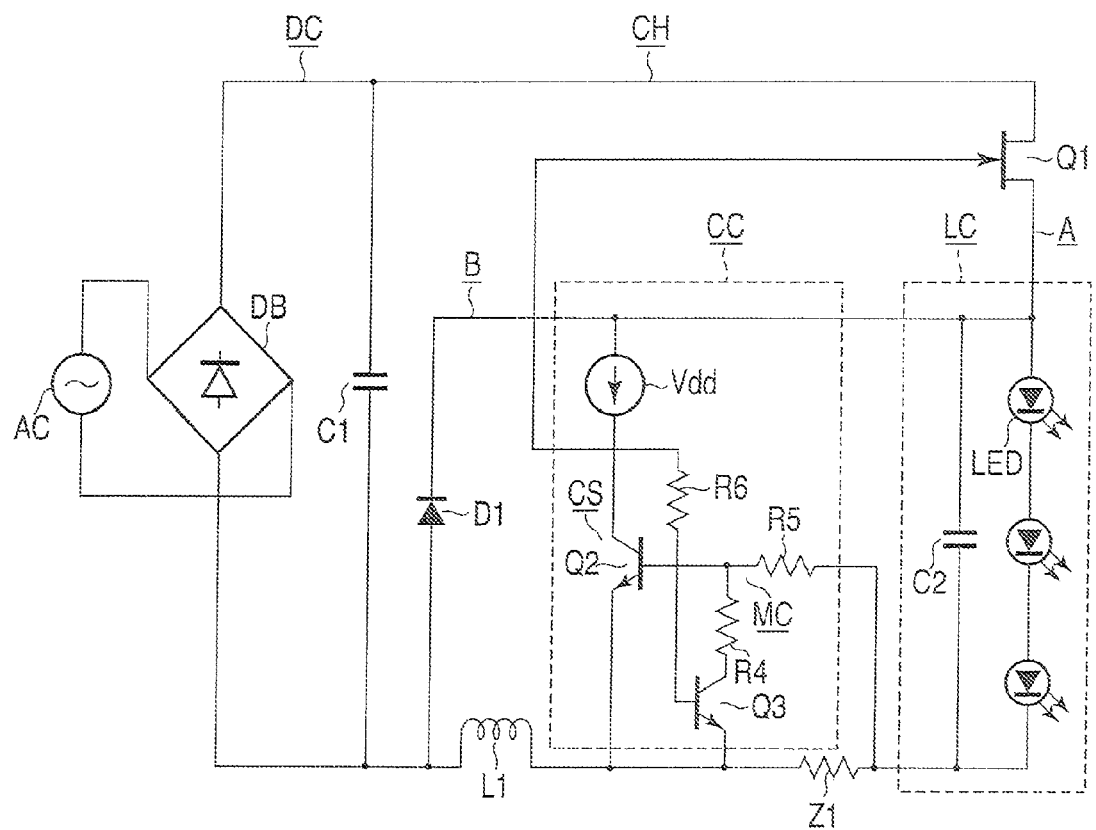
FIG. 10 illustrates a configuration example of an LED lighting device according to an embodiment.

An LED lighting device according to a seventh embodiment will be described below with reference to FIG. 10.

The seventh embodiment differs from the fifth and sixth embodiments in the control circuit CC. In FIG. 10, the same components as those of FIG. 7 are designated by the same numerals, and the descriptions thereof are omitted.

The control switch CS is mainly formed by a bipolar transistor Q2. In the bipolar transistor Q2, a collector is connected to the gate of the normally-on switch Q1 and connected to the source of the normally-on switch Q1 through a control power supply Vdd formed by a dropper, and an emitter is connected to the connection point of the inductor L1 and the impedance unit Z1.

The matching unit MC is mainly formed by a bipolar transistor Q3 and resistors R4 and R5. In the bipolar transistor Q3, the collector is connected to the base of the bipolar transistor Q2 of the control switch CS through the resistor R4, the emitter is connected to the connection point of the inductor L1 and the impedance unit Z1, and the base is connected to the collector of the bipolar transistor Q2 through a resistor R6. The series circuit of the resistors R5 and R4 and the collector and the emitter of the bipolar transistor Q3 is parallel-connected to the impedance unit Z1.

When the normally-on switch Q1 is turned on to pass the increased current, the bipolar transistor Q2 of the control switch CS is turned off, and the bipolar transistor Q3 of the matching unit MC is turned on. Therefore, the terminal voltage at the impedance unit Z1 is divided by the series circuit of the resistor R4 and the resistor R5, and the voltage at both ends of the resistor R4 is applied between the base and the emitter of the bipolar transistor Q2.

Therefore, the values of the resistors R4 and R5 are previously adjusted to relatively set the resistor R4 to a smaller value, whereby the bipolar transistor Q2 can be configured to become the off state at a level in which the increased current does not reach the first predetermined value. However, when the increased current reaches the first predetermined value, the bipolar transistor Q2 becomes the on state, and the negative voltage is applied to the gate of the normally-on switch Q1. Therefore, the normally-on switch Q1 is turned off to cut off the increased current.

Because the bipolar transistor Q3 is turned off when the bipolar transistor Q2 becomes the on state, when the normally-on switch Q1 is turned off to pass the decreased current, the terminal voltage at the impedance unit Z1 is applied to the bipolar transistor Q2 without dividing the terminal voltage, and the bipolar transistor Q2 maintains the on state. However, when the terminal voltage at the impedance unit Z1 is decreased to reach the second predetermined value, the bipolar transistor Q2 is turned off because the bipolar transistor Q2 cannot maintain the on state. As a result, the normally-on switch Q1 is turned on again. The chopper operation is continued by repeating the above-described circuit operation.

In the seventh embodiment, the chopper includes various choppers such as a step-down chopper, a step-up chopper, and a step-up/step-down chopper. The step-up/step-down chopper is formed by sequentially connecting the step-up chopper and the step-down chopper. In each chopper, the increased current is passed through the inductor from the DC power supply by turning on the normally-on switch, and the electromagnetic energy accumulated in the inductor is emitted by turning off the normally-on switch and the decreased current is passed to perform the chopper operation.

In the seventh embodiment, the control circuit comprises the control switch and the matching unit.

The control switch comprises at least a switch that switches the normally-on switch from the on state to the off state. Desirably the control switch may comprise a second switch that switches the normally-on switch from the off state to the on state. In such cases, the switch that switches the normally-on switch from the on state to the off state becomes a first switch.

The matching unit is interposed between the impedance unit and the control switch. The matching unit operates the control switch to turn off the normally-on switch, when the terminal voltage at the impedance unit reaches the first predetermined value while the increased current is passed through the impedance unit. The matching unit controls the control switch to turn on the normally-on switch, when the terminal voltage at the impedance unit reaches the second predetermined value while the decreased current is passed. The second predetermined value is lower than the first predetermined value.

There is no particular limitation to the matching unit as long as the matching unit has the above-described functions. Preferably the matching unit can be formed by a hysteresis comparator. Alternatively, the matching unit comprises a first detection unit that directly detects the terminal voltage at the impedance unit and a second detection unit that detects the terminal voltage through a voltage divider, and the control switch may switch the second detection unit to the first detection unit in conjunction with the turn-off of the normally-on switch.

When the normally-on switch is turned on, the increased current is passed from the DC power supply to the inductor. When the terminal voltage at the impedance unit reaches the first predetermined value, the control switch is turned on to apply the negative voltage to the gate of the normally-on switch through the matching unit. Therefore, the normally-on switch is turned off to cut off the increased current. The electromagnetic energy accumulated in the inductor is emitted in association with the cut-off of the increased current, the decreased current is passed from the inductor, and the control switch is turned off to release the application of the negative voltage to the gate of the normally-on switch through the matching unit, thereby turning on the normally-on switch. The chopper operation is performed by repeating the above-described circuit operation.

Because the load circuit is connected to the position on the circuit through which both the increased current and the decreased current are passed in association with the chopper operation, the DC-DC voltage conversion is performed, and the constant current control is performed under the converted voltage to light the light emitting diode having the load connected to the output end. The output capacitor that is parallel-connected to the light emitting diode of the load circuit is operated so as to bypass a high-frequency component included in the output of the chopper from the light emitting diode. As a result, the light emitting diode is lit by the smoothed DC current.

In the seventh embodiment, there is no particular limitation to the supply of the control power supply to the control circuit. Preferably the control power supply is obtained from the load circuit or the high-voltage side of the normally-on switch. In the mode in which the control power supply is obtained from the load circuit, because the DC voltage smoothed by the output capacitor is generated in the load circuit, a voltage that is higher than the gate threshold voltage of the normally-on switch is taken out from the load circuit to obtain the control power supply, which allows the simplification of the circuit configuration of the control power supply. In the mode in which the control power supply is obtained from the high-voltage side of the normally-on switch, for example, a voltage that is higher than the gate threshold voltage of the normally-on switch can be obtained from the drain side of the normally-on switch through the dropper.

In the seventh embodiment, the illuminating device means all the devices in which the light emitting diode is used as the light source. Accordingly, the illuminating device may be an illuminating apparatus, a display device, and a sign device. The illuminating device main body means a residual portion in which the LED lighting device is removed from the illuminating device.

According to the fifth to seventh embodiments, the normally-on switch is used as the main switching element of the chopper, and the LED lighting device comprises the switch and the control circuit. The switch controls the normally-on switch to become the off state by applying the negative voltage to the gate of the normally-on switch at least when the normally-on switch is turned on, and the switch controls the normally-on switch to become the on state by releasing the application of the negative voltage to the gate of the normally-on switch when the normally-on switch is turned off. The control circuit is interposed between the impedance element and the control switch. The control circuit turns on the control switch when the terminal voltage at the impedance element reaches the first predetermined value while the increased current is passed. The control circuit turns off the control switch when the terminal voltage at the impedance element reaches the second predetermined value that is lower than the first predetermined value while decreased current is passed. Therefore, the simple circuit configuration is obtained without providing the secondary winding in the inductor, and the easy-to-integrate chopper having the good characteristic and the illuminating device provided with the chopper can be provided.

Eighth Embodiment

Figure 11:
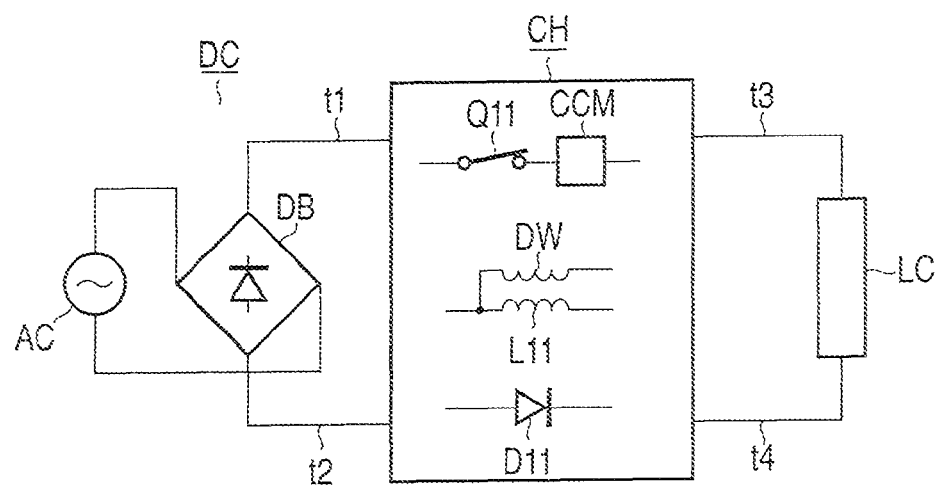
FIG. 11 illustrates a configuration example of an LED lighting device according to an embodiment.

FIG. 11 illustrates an eighth embodiment. An LED lighting device of the eighth embodiment comprises the DC power supply DC, the chopper CH, and the load circuit LC.

The DC power supply DC is a means for inputting the DC voltage of pre-conversion to the chopper CH. Any configuration may be adopted in the DC power supply DC as long as the DC voltage is outputted. For example, the DC power supply DC is mainly formed by a rectifying circuit DB, and desirably the DC power supply DC may comprise a smoothing circuit that is formed by a smoothing capacitor and the like. In the eighth embodiment, preferably the rectifying circuit DB is formed by a bridge type rectifying circuit, and the rectifying circuit DB performs the full-wave rectification to the AC voltage of the AC power supply AC, for example, the commercial AC power supply to obtain the DC voltage.

In the eighth embodiment, the chopper CH comprises DC input ends t1 and t2 and DC output ends t3 and t4. The chopper CH comprises one of various choppers such as the step-down chopper, the step-up chopper, and the step-up/step-down chopper. In each of configurations of various choppers, the chopper CH commonly comprises a switching element Q11, a constant-current unit CCM, an inductor L11, a diode D11, and a driving winding DW.

The switching element Q11 is formed by either a normally-off switch or a normally-on switch. The constant-current unit CCM is formed by either a constant-current unit in which the constant current value is previously fixed or a constant-current unit in which the constant current value is variable. One end of the inductor L11 is connected to the driving winding DW. The driving winding DW is magnetically coupled to the inductor L11. The driving winding DW induces a voltage proportional to the terminal voltage at the inductor L11 and applies the voltage to the control terminal of the switching element Q11 to drive the switching element Q11.

The chopper CH comprises a pair of the input ends t1 and t2 and a pair of the output ends t3 and t4, and an internal circuit of the chopper CH can be divided into a third circuit and a fourth circuit from the viewpoint of circuit operation. The third circuit passes the increased current from the DC power supply DC to accumulate the electromagnetic energy in the inductor L11. For the step-down chopper, the third circuit has a configuration in which the series circuit including the switching element Q11, the constant-current unit, the inductor L11, and the load circuit LC is connected to the DC power supply DC. In the third circuit, when the switching element Q11 is turned on, the increased current is passed from the DC power supply DC to accumulate the electromagnetic energy in the inductor L11.

The fourth circuit emits the electromagnetic energy, accumulated in the inductor L11, to pass the decreased current. For the step-down chopper, the fourth circuit has a configuration in which the series circuit including the diode D11 and the load circuit LC is connected to the inductor L11, and the decreased current is passed from the inductor L11 when the switching element Q11 is turned off.

For the step-up chopper, the chopper. CH comprises the third circuit in which the series circuit of the inductor L11, the switching element Q11, and the constant-current unit CCM is connected to the DC power supply DC and the fourth circuit in which the series circuit of the inductor L11, the diode D11, and the load circuit LC is connected to the DC power supply DC. For the step-up/step-down chopper, the chopper CH is configured as described above.

The load circuit LC comprises the light emitting diode that becomes the load and the parallel-connected output capacitor that bypasses the high-frequency component. For the step-down chopper, the load circuit LC is connected in the position on the circuit through which both the increased current and the decreased current are passed. For the step-up chopper, the load circuit LC is connected in the position on the circuit through which the decreased current is passed. The single light emitting diode LED is formed in the forward direction with respect to the current passed through the output end of the chopper, or the plurality of light emitting diodes LED are provided while series-connected.

Ninth to twelfth embodiments will be described with reference to FIGS. 12 to 17. In FIGS. 12 to 17, the same components as those of FIG. 11 are designated by the same numerals, and the descriptions thereof are omitted.

Ninth Embodiment

The ninth embodiment will be described below.

Figure 12:
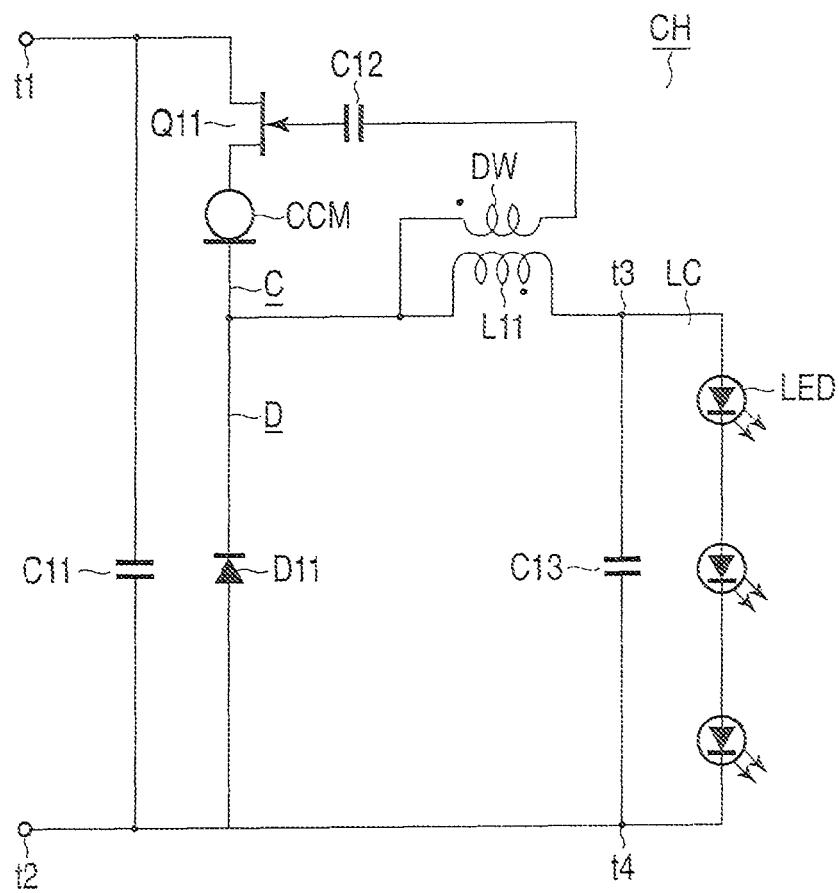
FIG. 12 illustrates a configuration example of an LED lighting device according to an embodiment.

FIG. 12 illustrates the ninth embodiment. In the ninth embodiment, a GaN-HEMT is used as the switching element Q11, a constant-current diode is used as the constant-current unit CCM, and the inductor L11 is connected between the constant-current unit CCM and the load circuit LC. In FIG. 12, the same components as those of FIG. 11 are designated by the same numerals, and the descriptions thereof are omitted. A high-frequency bypass capacitor C11 is connected between the input ends t1 and t2 of the chopper CH. A coupling capacitor C12 is inserted between the driving winding DW and the control terminal of the switching element Q11. The letter C designates the third circuit, and the letter. D designates the fourth circuit. The letter LED of the load circuit LC designates the light emitting diode, and the numeral C13 designates the output capacitor.

A circuit operation of the ninth embodiment will be described with reference to FIGS. 12 and 13.

Because the switching element Q11 of the chopper CH is turned on when the DC power supply DC is powered on, the current is passed from the DC power supply DC to the third circuit C through the switching element Q11 and the constant-current unit CCM, and the current is linearly increased. Therefore, the electromagnetic energy is accumulated in the inductor L11. The gate-source voltage $V_{GS}$ at the switching element Q11 becomes zero while the switching element Q11 is turned on. When the increased current reaches the constant current value of the constant-current unit CCM, the increasing tendency of the current is stopped, and the current is kept constant. While the increased current is passed through the inductor L11, the terminal voltage at the inductor L11 has the positive polarity as illustrated in a part (e) of FIG. 13.

Figure 13:
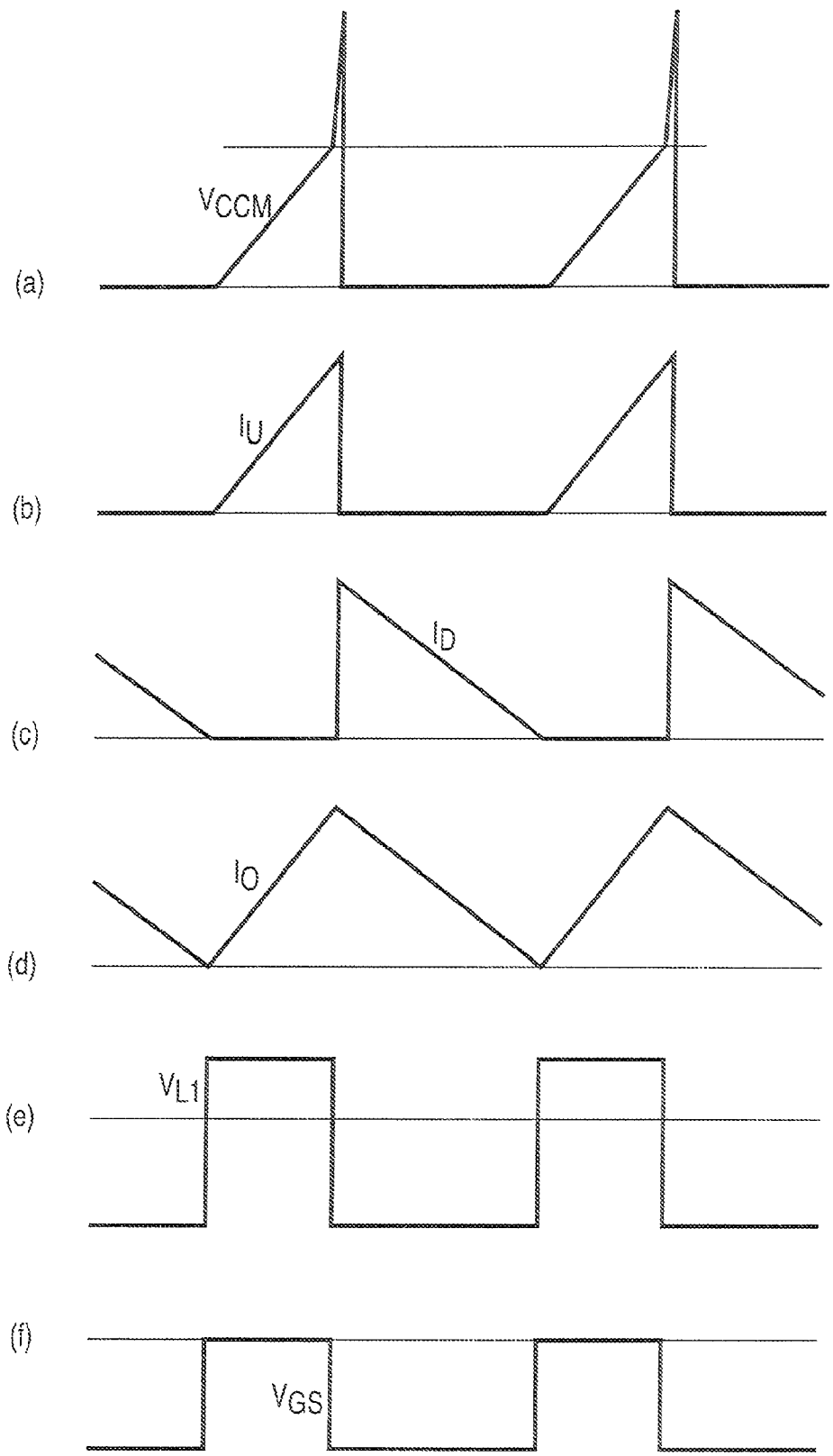
FIG. 13 illustrates an example of current and voltage waveforms in each unit of an LED lighting device according to an embodiment.

When the increased current reaches the constant current value of the constant-current unit CCM, because the current passed through the inductor L11 is further increased, the voltage $V_{CCM}$ at the constant-current unit CCM is increased in the pulse shape as illustrated in a part (a) of FIG. 13. Therefore, the source potential at the switching element Q11 becomes higher than the potential at the control terminal (gate). As a result, because the control terminal relatively and clearly becomes the negative potential, the switching element Q11 is turned off. Accordingly, the increased current $I_U$ passed through the inductor L11 is cut off by the turn-off of the switching element Q11 as illustrated in a part (b) of FIG. 13.

At the same time as the switching element Q11 is turned off, the emission of the electromagnetic energy accumulated in the inductor L11 is started to pass the decreased current to the fourth circuit D as illustrated in a part (c) of FIG. 13. While the decreased current is passed, the voltage polarity of the inductor L11 is inverted as illustrated in a part (e) of FIG. 13 to become the negative polarity, and the voltage is induced in the driving winding DW such that the control terminal of the switching element Q11 becomes the negative potential. At this point, as illustrated in a part (f) of FIG. 13, because the negative voltage is applied between the gate and the source of the switching element Q11 through the constant-current unit CCM, the switching element Q11 is maintained in the off state.

When the decreased current passed through the third circuit C becomes zero, the negative voltage applied to the control terminal of the switching element Q11 is not induced while the voltage in which the control terminal becomes positive as illustrated in the part (e) of FIG. 13 is induced in the driving winding DW by a counter-electromotive force. Therefore, the switching element Q11 is turned on again. Then the similar circuit operation is repeated.

As is clear from the circuit operation, the chopper CH performs the step-down chopper operation, the output current $I_O$ in which the increased current and the decreased current are alternately passed through the load circuit LC connected between the output ends t3 and t4 is formed as illustrated in a part (d) of FIG. 13, the light emitting diode LED is lit by the DC component, and the output capacitor C4 bypasses the high-frequency component.

Tenth Embodiment

A tenth embodiment will be described below.

FIG. 14 illustrates the tenth embodiment. In the tenth embodiment, a GaN-HEMT is used as the constant-current unit CCM, and the inductor L11 is connected to a position at which the load circuit LC is interposed between the constant-current unit CCM and the inductor L11.

In the constant-current unit CCM, the gate potential can be changed with an adjustable potential source E1, which allows the constant current value to be changed. In FIG. 14, a diode ZD1 clamps the gate-source voltage $V_{GS}$ at the switching element Q11 such that the gate-source voltage $V_{GS}$ does not become 0.6 V or more.

In the tenth embodiment, the switching element Q11, the constant-current unit CCM, and the diode D11, which constitute a series connection body, are formed as an integrated circuit IC. The integrated circuit IC comprises first to fifth external terminals P1 to P5. The first external terminal P1 is led out from the drain of the switching element Q11. The second external terminal P2 is led out from a cathode of the diode D11. The third external terminal P3 is led out from the connection point of the source of the constant-current unit CCM and an anode of the diode D11. The fourth external terminal P4 is led out from the gate of the switching element Q11. The fifth external terminal P5 is led out from the gate of the constant-current unit CCM.

In the integrated circuit IC, the first and second main terminals are led out from the main terminals of the semiconductor element located at both ends of a series connection body comprising three power-system semiconductor elements of the chopper, the third external terminal is led out from the main terminal of the intermediate connection portion of the series connection body, and the fourth and fifth external terminals are led out from the switching element Q11 and the control terminal of the constant-current unit CCM. Accordingly, the first to third external terminals are used for the power system, and the fourth and fifth external terminals are used for the control system.

In the tenth embodiment, because the constant-current unit CCM is formed by the GaN-HEMT similarly to the switching element Q11, the high-speed switching characteristic is further improved at a high frequency of 10 MHz or more. Desirably the diode D11 is made of a GaN material. Therefore, an integrated circuit can integrally be formed using the GaN substrate, extremely-high-speed switching is performed and the extremely compact chopper is easily formed.

Because the constant current value can be changed using the adjustable potential source E1, the desired load current is easily set. Additionally, when feedback control of the adjustable potential source E1 is performed with respect to a variation in power supply voltage, a variation in optical output of the light emitting diode can be suppressed with respect to the variation in power supply voltage. Further, the voltage drops of the constant-current unit CCM and the load circuit LC are added to the negative voltage of the driving winding DW, which applies to the control terminal of the switching element Q11.

Eleventh Embodiment

An eleventh embodiment will be described below.

Figure 15:
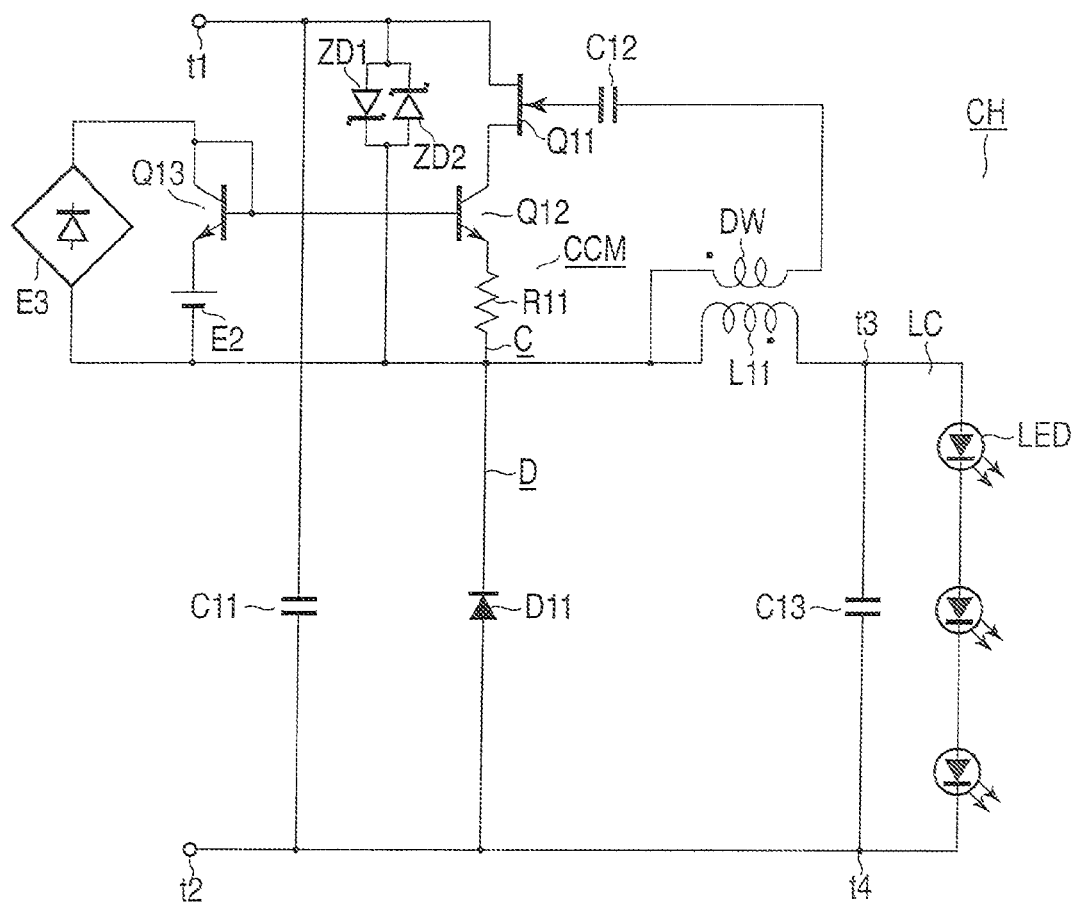
FIG. 15 illustrates a configuration example of an LED lighting device according to an embodiment.

FIG. 15 illustrates a schematic configuration of the eleventh embodiment. In FIG. 15, the same components as those of FIG. 12 are designated by the same numerals. In the eleventh embodiment, the constant-current unit CCM is formed by a current mirror constant-current circuit in which transistors Q12 and Q13 are used. In the current mirror constant-current circuit, the series circuit of the transistor Q12 and the resistor R11 is inserted in series with the switching element Q11, the base of the transistor Q12 is connected to the base of the transistor Q13, and emitter is connected to a bias power supply E2 in a reversed polarity manner, and a DC power supply E3 is connected to the series circuit of the collector and the bias power supply E2. The collector and the base of the transistor Q13 are directly connected by a conductor.

A pair of zener diodes ZD1 and ZD2 is parallel-connected in the reversed polarity manner between the control terminal of the switching element Q11 and the position that steps over the constant-current unit CCM, thereby forming a clamp circuit. The zener diode ZD1 has a zener voltage of −12 V, and the zener diode ZD2 has a zener voltage of +0.7 V. The zener diodes ZD1 and ZD2 protect the switching element Q11 such that the excess voltage $V_{GS}$ is not applied to the switching element Q11.

According to the eleventh embodiment, the constant current value passed through the transistor Q12 can desirably be controlled by the DC voltage connected to the transistor Q13, and the voltage generated in reaching the constant current value is increased. Therefore, it is not necessary to utilize the voltage at the light emitting diode LED that is the load.

The DC power supply E2 is used to control the constant current value of the constant-current unit CCM. Therefore, the transistor in which high-speed control can be performed is not required. When the constant-current unit CCM is turned off in synchronization with the turn-off of the switching element Q11, the switching element Q11 can substantially be used as the normally-off switching element. Desirably the semiconductor component portions of the switching element Q11, the constant-current unit CCM, and the diode D11 can be integrated into a GaN chip.

Twelfth Embodiment

A twelfth embodiment will be described below.

Figure 16:
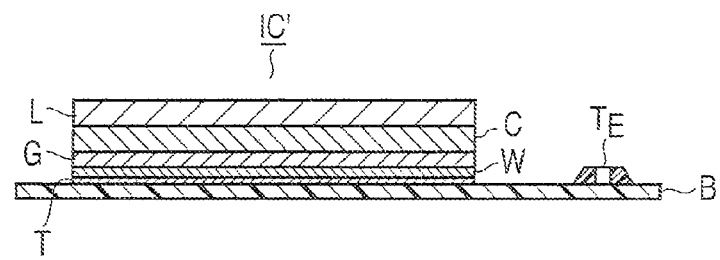
FIG. 16 illustrates an example of an integrated circuit module of an LED lighting device according to an embodiment.
Figure 17:
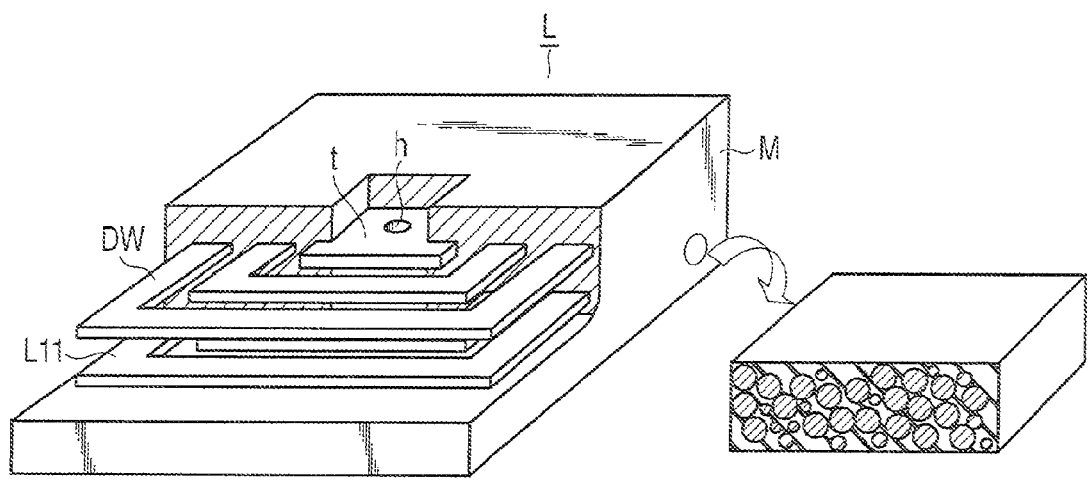
FIG. 17 illustrates an example of an integrated circuit module of an LED lighting device according to an embodiment.

FIGS. 16 and 17 illustrate the twelfth embodiment. FIG. 16 is a schematic diagram of the integrated circuit module of the twelfth embodiment in which the LED lighting device is implemented. FIG. 17 is a partially enlarged and sectional perspective view schematically illustrating a planar coil structure.

In the twelfth embodiment, a semiconductor component, a coil component, a capacitor component, and an external terminal of the LED lighting device are mainly integrated in a part of or the plurality of eighth to eleventh embodiments. That is, the residual circuit components except the light emitting diode LED of the LED lighting device are formed while divided into planar structures. The planar structures comprise a planar coil structure L, a planar capacitor structure C, a GaN chip G, a wiring formation body W, a terminal formation body T, and a substrate construction body B. The planar structures are integrally stacked and connected to each other using a means such as a through-hole, thereby forming an integrated circuit module IC. The integrated circuit module IC of FIG. 16 is roughly formed by the following planar structures.

As illustrated in FIG. 17, in the planar coil structure L, each of the inductor L11 and the driving winding DW is formed by winding a flat coil wire into a spiral shape in a plane. The flat coil wire formed into the spiral shape is retained such that the wires are properly separated from one another, and the inside and the surround are coated with a magnetic layer M. Therefore, the planar coil structure L is formed into a planar shape as a whole.

One end of each of the inductor L11 and the driving winding DW is located in a central portion of the coil to constitute a terminal portion t. A through-hole h is made in the center of the terminal portion t, one of terminal conductors of a constant-current unit portion of the GaN chip G is inserted in the through-hole h, and a conductive material is injected in the through-hole h to collectively connect connection conductors of the inductor L11, the driving winding DW, and the GaN chip G. As illustrated in a partially enlarged section on the right of FIG. 17, for example, the magnetic layer M is made of ceramics or plastic in which ferrite fine particles are dispersed.

The planar capacitor structure C comprises a pair of electrodes that sandwich a thin dielectric film therebetween and a plurality of capacitors are collected in the planar capacitor structure C.

The GaN chip G is a planar structure in which the switching element Q11, the constant-current unit CCM, and the diode D11 are formed in the GaN semiconductor substrate.

The wiring formation body W is a planar structure that connects the terminal formation body T and the planar coil structure L, the planar capacitor structure C, the GaN chip G.

The terminal formation body T is interposed between the wiring formation body W and the substrate construction body B to connect the wiring formation body W and the substrate construction body B.

The substrate construction body B comprises an external terminal TE and an external attaching unit (not illustrated), and the substrate construction body B integrally supports the planar structures to achieve the modularization. The external terminal TE comprises an input terminal of the LED lighting device and an output terminal to which the light emitting diode LED is connected.

The twelfth embodiment is suitable to the LED lighting device that is operated at a high frequency of 10 MHz or more, and the external terminal TE provided in the substrate construction body B is used only for the DC. Therefore, the operation is stable and the miniaturization can significantly be realized due to only input and output of the DC. Accordingly, the LED lighting device can be provided between the light emitting diodes of the illuminating device, which contributes to the significant miniaturization of the illuminating device.

In one embodiment, the LED lighting device comprises a series connection body of the switching element, the constant-current unit, and the diode. The series connection body comprises an integrated circuit, the integrated circuit comprises first and second external terminals, a third external terminal, and fourth and fifth external terminals. The first and second external terminals are led from a pair of main terminals located on both end sides of the series connection body. The third external terminal is led from a main terminal located in the intermediate connection portion of the series connection body. The fourth and fifth external terminals are led from the switching element and the control terminal of the constant-current unit.

In the embodiments, the "chopper" is a concept including various choppers such as the step-down chopper, the step-up chopper, and the step-up/step-down chopper. The step-up/step-down chopper is formed by sequentially connecting the step-up chopper and the step-down chopper. In each chopper, the increased current is passed through the inductor from the DC power supply by turning on the switching element, and the electromagnetic energy accumulated in the inductor is emitted to pass the decreased current through the diode by turning off the switching element. The chopper operation is repeatedly performed to perform the DC-DC conversion of the DC power supply voltage, and the converted voltage is output to the output end.

The switching element may be either the normally-on switch or the normally-off switch. When the wide-bandgap semiconductor, for example, the GaN-HEMT is used as the switching element, the switching characteristic is extremely improved to lower a switching loss at a high frequency of 10 MHz or more, and the inductor is also miniaturized. Therefore, the LED lighting device can significantly be miniaturized.

For the switching element in which the wide-bandgap semiconductor is used, the switching element having the normally-on characteristic is more easily obtained, and the switching element is less inexpensive. However, the switching element having normally-off characteristic may be used because the switching element having normally-off characteristic can also be obtained. The normally-on switch having a negative switching threshold is suitably used because the off control is easily performed using the driving winding that is magnetically coupled to the inductor.

The constant-current unit has the constant current characteristic. For example, various constant-current circuits in which a constant-current diode, a junction FET, a three-terminal regulator, and a transistor are used can be used as the constant-current unit. A well-known constant-current circuit in which one or two transistors are used may be used as the constant-current circuit in which the transistor is used. The GaN-HEMT that is a kind of the junction FET can be used as the constant-current circuit. Because the switching element has an excellent switching characteristic at a high frequency of 10 MHz or more, the switching element is suitably used to perform the high-speed switching.

The constant-current unit is disposed in the first circuit while series-connected to the switching element. In the first circuit, the current is passed through the inductor when the switching element is turned on. The constant-current unit is also disposed in the driving circuit of the switch element comprising the driving winding that drives the switching element. Therefore, when the increased current passed through the constant-current unit is further increased after reaching the constant current value, because the voltage at the constant-current unit is rapidly increased, the potential at the main terminal (for example, source) incorporated in the driving circuit of the switching element can be set relatively higher than the potential at the control terminal (for example, gate) by the voltage increase generated in the constant-current unit. As a result, the potential at the control terminal becomes lower than the threshold of the switching element, so that the switching element can be turned off. The circuit operation is more easily and securely performed because the switching element is the normally-on switch having the negative threshold. However, the circuit operation is also effectively performed in the normally-off switch.

The switching element and the constant-current unit are permitted to be directly series-connected. In such cases, it is easy to integrate the switching element and the constant-current unit in the common semiconductor chip, for example, the GaN chip. At this point, the switching element and the constant-current unit can be formed by an IC module having a four-terminal structure. The IC module comprises: one of main terminals of the switching element, for example, the drain; two power-system terminals formed by the main terminals on the other end side with respect to the switching element of the constant-current unit; and two control-system terminals formed by the control terminals of the switching element and the constant-current unit, for example, the gates. Therefore, the single component can further be miniaturized.

The inductor accumulates the electromagnetic energy therein when the increased current is passed from the DC power supply to the first circuit through the switching element and the constant-current unit. When the switching element is turned off, because the inductor emits the accumulated electromagnetic energy, the decreased current is passed through the second circuit.

When the chopper is operated at a high frequency of 10 MHz or more, the inductor and the driving winding magnetically coupled to the inductor are formed into the planar coil structure, and the capacitor is formed into the planar structure. Therefore, the integrated circuit of the chopper is advantageously achieved, and the high-reliability operation is obtained. Namely, the integrated circuit module can be formed by stacking and integrating the inductor and driving winding having the planar coil structure, the capacitor having the planar structure, and the semiconductor chip in which the semiconductor components such as the switching element, the constant-current unit, and the diode are integrated. As a result, the significantly compact LED lighting device can be achieved. Therefore, because a distance between the driving coil and the switch becomes the shortest, generation of unnecessary and harmful parasitic inductance or parasitic capacitance, which causes noise generation, can be suppressed to the minimum level to improve the stability and reliability of the chopper operation.

The diode provides the second circuit that is the pathway when the decreased current is passed from the inductor. When the wide-bandgap semiconductor, for example, the GaN diode is used as the diode, the higher-speed switching can be realized. In such cases, the diode is easily formed as the integrated circuit of the semiconductor element along with the switching element and the constant-current unit. The integrated circuit has the structure having the five external terminals in the series connection body of the switching element, the constant-current unit, and the diode. The five external terminals comprise the three power-system main terminals and the two control terminals. The three power-system main terminals comprise the main terminal on one end side of the series connection body, the main terminal on the other end side, and the main terminal of the intermediate connection point. The two control terminals are used to control the switching element and the constant-current unit, respectively.

When the chopper is formed by the integrated circuit, the whole is further miniaturized, and the high-speed switching is easily performed.

The driving winding is magnetically coupled to the inductor, and the driving winding controls the switching element. When the increased current passed through the inductor in turning on the switching element reaches the constant current value of the constant-current unit to turn off the switching element, because the large voltage is generated, the potential at the main terminal (source) of the switching element becomes higher than the potential at the control terminal, and the control terminal relatively becomes the negative potential to fall below the threshold. Therefore, the switching element is maintained in the off state.

According to the eighth to twelfth embodiments, the switching element is turned off by the voltage generated in the constant-current unit when the increased current passed from the DC power supply to the inductor through the constant-current unit in turning on the switching element reaches the constant current value of the constant-current unit. Therefore, when the increased current reaches the predetermined value, the switching element can be turned off to perform the chopper operation by the simple configuration without providing a current feedback type feedback circuit. The current feedback type feedback circuit comprises the impedance unit, such as the resistive element, which detects the current passed through the inductor and the control circuit that turns off the switching element when the voltage drop reaches the previously-set threshold. Accordingly, the LED lighting device provided with the easy-to-integrate and easy-to-miniaturize chopper having the simple circuit configuration can be provided.

The inductor and the driving winding are formed into the planar coil structure, and at least the switching element and the diode constitute the integrated circuit that is stacked on at least one surface of the planar coil structure. Therefore, the distance between the driving coil and the switching element becomes the shortest, and the generation of the unnecessary and harmful parasitic inductance or parasitic capacitance, which causes the noise generation, can be suppressed to the minimum level to improve the stability and reliability of the chopper operation.

When the switching element, the constant-current unit, and the diode are formed into the integrated circuit comprising the five external terminals, the high-speed switching is easily performed while the whole of the chopper is further miniaturized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A lighting device comprising:
at least one first normally-on type switching element;
an output generation unit that generates DC output by an on-off operation of the at least one first normally-on type switching element;
a semiconductor light emitting element that is lit by the DC output generated by the output generation unit; and
a driving control unit that causes the at least one first normally-on type switching element to perform an off operation using a current passed through the semiconductor light emitting element;
wherein the driving control unit comprises a second normally-on type switching element.

2. The lighting device according to claim 1, wherein the driving control unit causes the at least one first normally-on type switching element to perform the off operation using a forward voltage generated in the semiconductor light emitting element.

3. The lighting device according to claim 2, wherein the driving control unit is configured to cause the at least one first normally-on type switching element to perform the off operation by making potential of a control terminal to a main terminal of the at least one first normally-on type switching element lower than a threshold of the control terminal potential of the at least one first normally-on type switching element using a forward direction voltage generated in the semiconductor light emitting element.

4. The lighting device according to claim 2, wherein the driving control unit is configured to cause the at least one first normally-on type switching element to perform the off operation when a forward direction voltage generated in the semiconductor light emitting element is lower than the threshold of a control terminal potential of the at least one first normally-on type switching element or when the forward direction voltage generated in the semiconductor light emitting element is higher than a predetermined voltage.

5. The lighting device according to claim 1, wherein the at least one first normally-on type switching element comprises a normally-on type field effect transistor.

6. The lighting device according to claim 5, wherein a main terminal of the at least one first normally-on type switching element is a source terminal or a drain terminal of the normally-on type field effect transistor.

7. The lighting device according to claim 5, wherein a control terminal of the at least one first normally-on type switching element is a gate terminal of the normally-on type field effect transistor.

8. The lighting device according to claim 1, wherein the at least one first normally-on type switching element comprises gallium nitride.

9. The lighting device according to claim 1, wherein the at least one first normally-on type switching element comprises a high electron mobility transistor.

10. The lighting device according to claim 1, wherein the second normally-on type switching element comprises gallium nitride.

11. The lighting device according to claim 1, wherein the second normally-on type switching element comprises a high electron mobility transistor.

12. A power-supply device for a semiconductor light emitting element comprising:
a DC power supply;
a chopper that comprises a normally-on switch, an inductor, a free-wheel diode, and a current detecting impedance element, the chopper performing a chopper operation in which an increased current is passed through the inductor in turning on the normally-on switch while a decreased current is passed from the inductor in turning off the normally-on switch, the chopper performing DC-DC conversion of a DC voltage output from the DC power supply and outputting the DC voltage to an output end, the current detecting impedance element being inserted in a position on a circuit through which the increased current and decreased current are passed; and
a control circuit that comprises:
a control switch controlling the normally-on switch to be in an off state by applying a negative voltage to a gate of the normally-on switch at least when the switch is turned on, the switch controlling the normally-on switch to be in an on state by releasing the application of the negative voltage to the gate of the normally-on switch when the switch is turned off, and
a matching unit interposed between the impedance element and the control switch, the matching unit turning on the control switch when a terminal voltage at the impedance element reaches a first predetermined value while the increased current is passed, the matching unit turning off the control switch when the terminal voltage at the impedance element reaches a second predetermined value while the decreased current is passed, the second predetermined value being lower than the first predetermined value.

13. An illuminating apparatus comprising:
a semiconductor light emitting element; and
the power-supply device for a semiconductor light emitting element according to claim 12.

14. A power-supply device for a semiconductor light emitting element comprising:
a DC power supply;
a chopper that comprises a normally-on switch, an inductor, a free-wheel diode, and a current detecting impedance element, the chopper performing a chopper operation in which an increased current is passed through the inductor in turning on the normally-on switch while a decreased current is passed from the inductor in turning off the normally-on switch, the chopper performing DC-DC conversion of a DC voltage output from the DC power supply and outputting the DC voltage to an output end, the current detecting impedance element being inserted in a position on a circuit through which the increased current and decreased current are passed;
a control switch including:
a first switch controlling the normally-on switch to be in an off state by applying a negative voltage to a gate of the normally-on switch, and
a second switch controlling the normally-on switch to be in an on state by releasing the application of the negative voltage to the gate of the normally-on switch; and
a control circuit that comprises a matching unit interposed between the impedance element and the control switch, the matching unit turning on the control switch when a terminal voltage at the impedance element reaches a first predetermined value while the increased current is passed, the matching unit turning off the control switch when the terminal voltage at the impedance element reaches a second predetermined value while the decreased current is passed, the second predetermined value being lower than the first predetermined value.

15. The power-supply device for a semiconductor light emitting element according to claim 14, wherein the control circuit comprises the matching unit comprising a hysteresis comparator.

16. An illuminating apparatus comprising:
a semiconductor light emitting element; and
the power-supply device for a semiconductor light emitting element according to claim 14.

* * * * *